United States Patent [19]

Neff

[11] Patent Number: 4,885,711

[45] Date of Patent: Dec. 5, 1989

[54] DATA PROCESSING

[76] Inventor: Dennis B. Neff, c/o Phillips Petroleum Company, Bartlesville, Okla. 74004

[21] Appl. No.: 94,238

[22] Filed: Sep. 8, 1987

Related U.S. Application Data

[63] Continuation of Ser. No. 589,446, Mar. 14, 1984, abandoned.

[51] Int. Cl.$^4$ .......................... G06G 7/12; H03F 1/26; G01V 1/00
[52] U.S. Cl. ..................................... 364/574; 364/421; 364/582; 364/575; 367/42; 367/63
[58] Field of Search ............... 364/421, 574, 575, 582; 367/42, 60, 62, 63

[56] References Cited

U.S. PATENT DOCUMENTS

| | | | |
|---|---|---|---|
| Re. 30,764 | 10/1982 | Muir et al. | 364/487 |
| 3,284,763 | 11/1966 | Burg et al. | 367/45 |
| 3,344,158 | 9/1967 | Feather et al. | 260/397.5 |
| 3,470,530 | 9/1969 | Smitherman | 367/43 |
| 3,638,175 | 1/1972 | Stone | 367/63 |
| 3,894,222 | 7/1975 | Siems | 364/574 |
| 3,924,260 | 12/1975 | Braham et al. | 367/63 X |
| 4,086,651 | 4/1978 | Muir et al. | 364/487 |
| 4,131,857 | 12/1978 | Clymer | 328/163 |
| 4,190,886 | 2/1980 | Sherman | 364/415 |
| 4,203,161 | 5/1980 | Johnson et al. | 367/63 X |
| 4,204,279 | 5/1980 | Parrack et al. | 364/421 X |
| 4,210,968 | 7/1980 | Lindseth | 364/421 X |
| 4,218,765 | 8/1980 | Kinkade | 367/45 |
| 4,314,347 | 2/1982 | Stokely | 364/421 X |
| 4,344,158 | 8/1982 | Landrum, Jr. et al. | 364/421 X |
| 4,561,074 | 12/1985 | Warmack | 364/421 X |
| 4,561,075 | 12/1985 | Smith et al. | 367/63 X |
| 4,630,242 | 12/1986 | Done | 367/42 X |
| 4,750,156 | 6/1988 | Abrams et al. | 367/42 |

OTHER PUBLICATIONS

Kodera, K. et al, "Analysis of Time-Varying Signals With Small BT Values", *IEEE Transactions on Acoustics, Speech, and Signal Processing*, vol. ASSP-26, No. 1, Feb. 1978, pp. 64-75.

*Primary Examiner*—Parshotam S. Lall
*Assistant Examiner*—Joseph L. Dixon
*Attorney, Agent, or Firm*—Richmond, Phillips, Hitchcock & Umphlett

[57] ABSTRACT

A method for removing noise from seismic wiggle traces is provided. Data points from the seismic traces are selected for which amplitude and derivative values are determined. The derivative values are crossplotted as a function of the amplitude values. A rejection line is then selected on the crossplot wherein all data points which plot outside of the rejection line are treated as noise, such data points being assigned a new amplitude value to thereby remove the noise from the seismic traces.

17 Claims, 17 Drawing Sheets

FIG. 11

DATA PROCESSING

This application is a continuation of application Ser. No. 589,446, filed Mar. 14, 1984, now abandoned.

BACKGROUND OF THE INVENTION

This invention relates to a method for removing noise from data. In one aspect this invention relates to a method for removing noise from seismic data where sinusoid type traces are present. The present invention is applicable to the removal of noise from any suitable data. In general, suitable data will be linear, logarithmic or sinusoidal in nature. Examples of such data are seismic data, sonic log data, density log data and other similar geophysical data. However, for the sake of illustration, the invention is described hereinafter in terms of seismic data.

The seismic method of mapping geological subsurfaces of the earth involves the use of a source of seismic energy and reception of the seismic energy by an array of seismic detectors, generally referred to as geophones. When used on land, the source of seismic energy generally is a high explosive charge electrically detonated in a borehole located at a selected grid point in a terrain or is an energy source capable of delivering a series of impacts to the earth's surface such as that used in Vibroseis systems. The acoustic waves generated in the earth by the explosion or impacts are reflected back from pronounced strata boundaries and reach the surface of the earth with varying amplitudes after varying intervals of time, depending on the distance and nature of the subsurface traversed. These returning acoustic waves in the form of sinusoidal type wave forms are detected by the geophones, which function to transduce such acoustic waves into representative electrical signals (generally referred to as "seismic wiggle traces"). The plurality of geophones are arrayed in a selected manner to detect most effectively the returning acoustic waves and generate electrical signals representative thereof. Information may be deduced concerning the geological subsurface of the earth from these electrical signals.

In addition to containing information of interest, seismic wiggle traces may also contain noise. Noise can be described as a high amplitude signal or a high amplitude, high frequency signal imposed on a wiggle trace. This noise may be caused by a plurality of phenomena such as powerline surges, environmental changes or general operation of the seismic exploration system. Also, high amplitude noise referred to as ground roll, tube waves or water bottom multiples may be present in the seismic data. The presence of the noise, especially the high amplitude noise, is a plague to interpreters since the noise may interfere with or mask the desired data which makes computer processing and interpretation of the seismic wiggle traces difficult.

Many attempts have been made in the past to develop methods of removing noise from seismic wiggle traces. The methods must be adaptable to computer processing since the shear volume of the data requires such processing. Also, the method should preferably be simplistic in operation. A brief discussion of some of the methods previously developed follows:

One method is generally referred to as a median filter. The median filter will reorder anomalous amplitudes (noise) to the ends of each data sorted window and will not return a noise value when the median data point of each window is chosen. The disadvantage occurs when data windows do not contain noise which is most of the time. The median value of a noise free window is not necessarily the original data value. Amplitude analysis schemes have also been developed. Such schemes vary but usually work on the principle of comparing the amplitude of each sample to that of a previous sample or to the average of adjacent samples. If the test sample amplitude differs more than a preset factor from the comparator sample, the test sample is revalued to equal the previous sample or the average of the adjacent window samples. This method works well for high amplitude noise but can fail if the noise has low to moderate amplitude.

Derivative schemes have also been developed. Typically, the slope or derivative of a sample is determined and tested against a preset maximum value. The results are good on single sample noise spikes but can fail if a noise burst is amplitude clipped and the slope becomes zero for extended samples.

SUMMARY OF THE INVENTION

It is thus an object off this invention to provide a method for removing noise, and especially high amplitude noise, from data such as seismic wiggle traces, which overcomes many of the problems encountered by the prior art.

In accordance with the present invention, seismic wiggle traces are converted into an amplitude-derivative crossplot. It has been found that actual seismic data will cluster within a central area on such a plot but that noise, and especially noise spikes of high amplitude, will be outside of such a central area. Thus, a method is provided for identifying data points on a seismic wiggle trace which are affected by noise. Once identified, data processing can be used to remove the effect of the noise to enable plotting of a substantially noise free seismic trace.

Other objects and advantages of the invention will be apparent from the foregoing brief description of the invention and the claims as well as the detailed description of the drawings which are briefly described as follows:

BRIEF DESCRIPTION OF THE DRAWINGS

FIGS. 11 and 12 illustrate actual printouts of the computer programs described hereinafter;

DETAILED DESCRIPTION

The noise removal method of the present invention is described hereinafter as a set of sequential steps. The order of these steps may be varied if desired. However, the preferred sequence is as follows. The preferred sequence is utilized to generally describe the invention. The Examples are utilized for a more detailed description.

1. SELECT A NORMALIZING WINDOW

In analysis of large quantities of data of varying values, it is highly desirable that the data be compared in reference to a standard or common value. This referencing to a standard is known as normalization. In the case of seismic data, a large amount of data is contained in a single trace. Therefore, the traces are divided into windows for two reasons: (1) it gives the computer a finite amount of data for the series of operations and (2) most important it tends to cluster data having similar amplitudes. Seismic data is very dynamic with clusters of high and low amplitude signals. If the normalizing as described is performed over the entire trace, the higher amplitudes tend to bias the normalizing factor. Thus, while normalizing is not required, it is preferred. In view of this preference, this invention is described in terms of using the normalizing step.

Any desired normalizing window can be selected. The normalizing window is generally set in the range of about 500 milliseconds to about 1000 milliseconds. It has been found that, for best results, at least 100 data points should be contained in a window. For a 4 millisecond sample rate, which is typical, a 500 millisecond window would encompass 125 data points. Shorter normalizing windows tend to reduce the amount of noise which can be identified since noise in the window will bias the normalizing multiplying factor.

Once the window is selected, the seismic wiggle traces are divided into the selected intervals beginning at zero time. Each window is processed separately but a number of traces, from different geophones, may be processed simultaneously.

Figure 1:
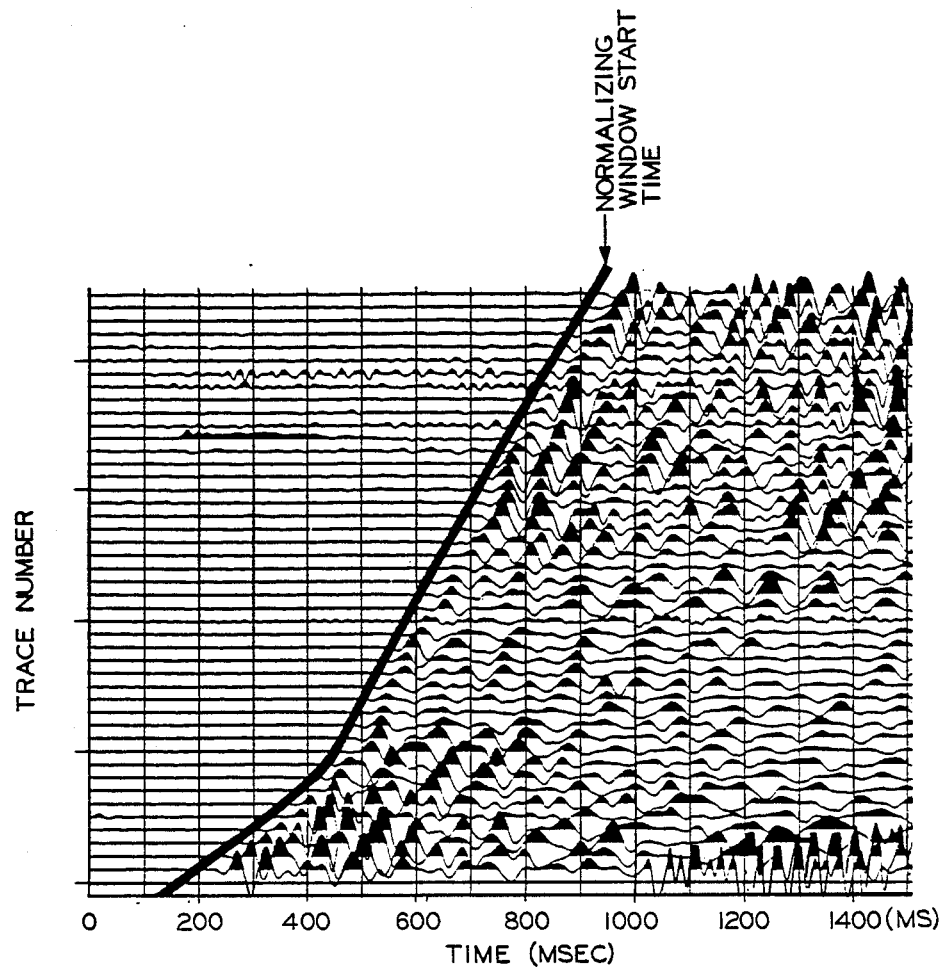
FIG. 1 is an illustration of seismic data which shows 1500 milliseconds of seismic data with a 500 millisecond normalizing window beginning at varied times.

An example of seismic data which shows 1500 milliseconds (msec) of a 500 millisecond normalizing window beginning at zero time is illustrated in FIG. 1. Referring to FIG. 1, it is noted that data begins to be received by the various geophones (each wiggle trace is supplied from a different geophone set) at different times. If the first normalizing window is begun at a fixed time, such as zero time, then it can be seen that no valid information would be present (dominantly zeros) on the upper wiggle traces. This has an adverse affect on the normalizing procedure which will be described hereinafter and thus, the first window is given a length of zero to the first break time interval. The start for the first normalizing window is preferably set as illustrated in FIG. 1. It should be remembered that the ;b 500 ms window should be measured in reference now to the window start time and not the wiggle trace zero time.

First break time is defined as that time data is first received at the geophone.

2. DETERMINE AMPLITUDE AVERAGE OF WINDOW

Seismic wiggle traces, such as those illustrated in FIG. 1, are conventionally in digital format. In this step, the average amplitude of each digital format window is determined.

3. NORMALIZE THE AMPLITUDE

In this step a normalizing value is selected by the interpreter (this value is referred to hereinafter as the "normalizing constant"). Any desired normalizing constant can be used based on the size of the resultant normalized data number desired. A typical normalizing constant is 10. The average determined in Step 2 is then divided into the normalizing constant determined by the interpreter in this Step 3 to determine a multiplier. All of the amplitudes for the seismic wiggle traces in the window are then multiplied by such multiplier to normalize each amplitude. These are the data values used in the crossplot.

4. DETERMINE AVERAGE DERIVATIVE

The derivative of the seismic wiggle trace for each data point is determined. An average derivative for the window is then determined. Typically, for a 4 millisecond sample rate, this average will be about one-half of the average determined in Step 2 above and, even at different sample rates, will always be less than the average determined in Step 2 above.

Any desired method may be utilized to determine the derivative. Methods such as backward difference, forward difference, central difference or the Hilbert transform are suitable. A 2 point forward difference or backward difference calculation is preferred because it has the advantage of allowing a noise spike to affect the slope (derivative) calculation at the spike value and at only one adjacent sample. Further, such calculation is relatively simple and is more rapidly computed than a central difference or other derivative methods. The resultant slope is the slope of a point between the two data points and not the data point.

Essentially the backward difference refers to the slope between the previous data point and the data point being analyzed. In contrast, the forward difference refers to the slope between the data point being analyzed and the next data point in time. A central difference refers to the average of the backward difference and forward difference and is the slope of the data point itself.

5. NORMALIZED DERIVATIVE

The average determined in Step 4 above is divided into the normalizing constant selected in Step 3 to determine a second multiplier. All derivative values in the window are then multiplied by this second multiplier to normalize the derivative to the same reference values as the amplitude. These are the data used in the crossplot.

6. CROSSPLOT NORMALIZED DATA

Figure 11:
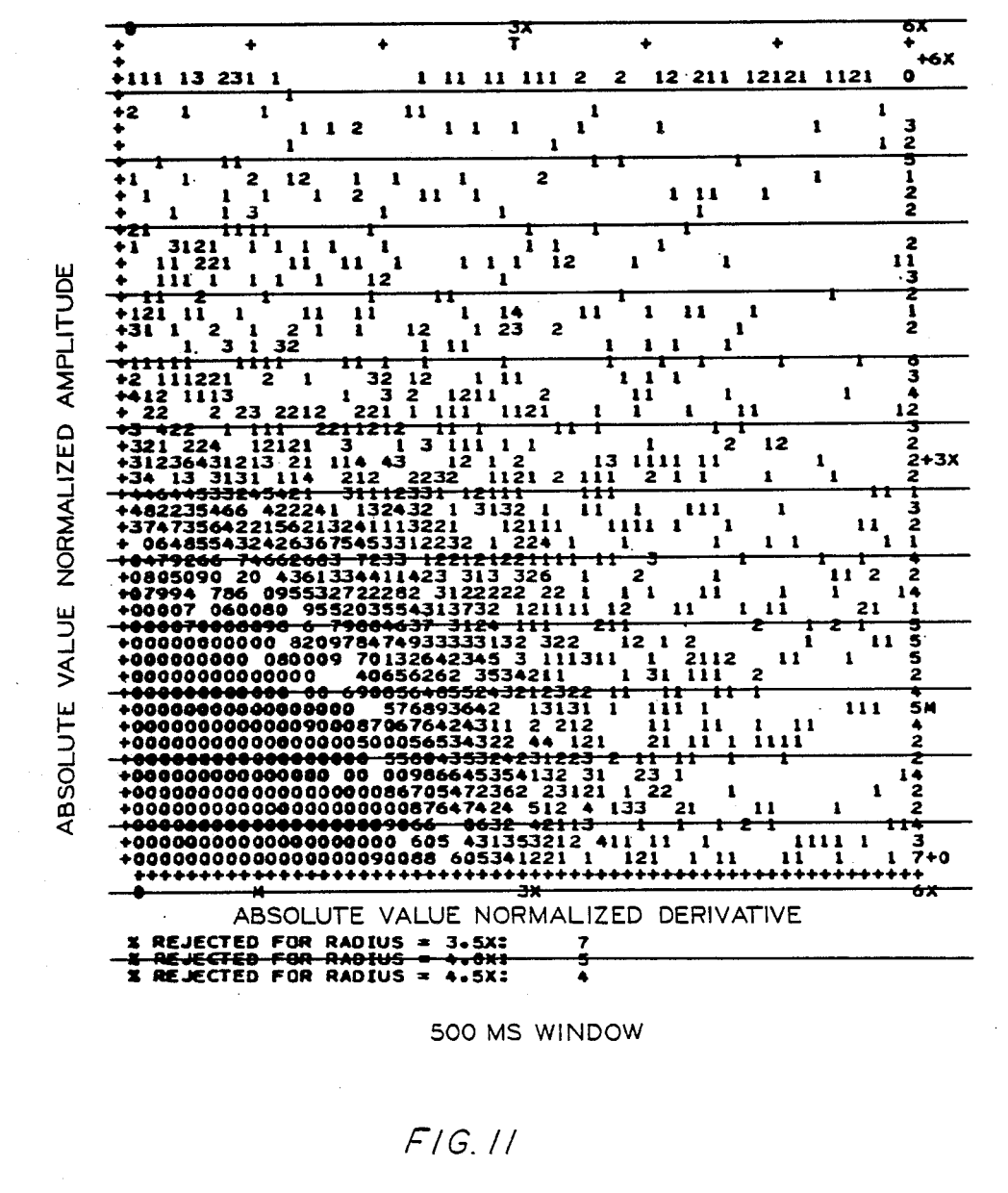

The normalized amplitude (ordinate) and normalized derivative (abscissa) are crossplotted. As has been previously stated, and as will be more fully illustrated in the examples, actual seismic data will tend to cluster at the center of the crossplot. If the absolute values of the normalized data are used all the plots will fall in the first quadrant of the crossplot. Under this condition actual seismic data will tend to cluster around the origin as illustrated in FIG. 11.

7. DEFINE REJECTION RADIUS

Because of the normalizing procedure described above, a circle can be utilized for the rejection of noise. Any desired radius of the circle (referred to "rejection radius") can be utilized. The rejection radius will typically be in the range of about 3 times the normalizing constant to about 6 times the normalizing constant. A rejection radius in the range of about 4 times the normalizing constant to about 4.5 times the normalizing constant is generally an effective choice.

8. REMOVE NOISE FROM DATA

Each data point is examined in accordance with equation 1

$$\text{If } A^2+D^2>R^2 \text{ then } A=A_{new} \tag{1}$$

where
- A = normalized amplitude value;
- D = normalized derivative value;
- R = rejection radius; and
- $A_{new}$ = new amplitude.

If $A^2+D^2$ is greater than $R^2$, then it is necessary to assign a new amplitude to the data point since the old amplitude is a result of noise. Any desired method may be utilized to assign such a new value. Generally, such data points are either zeroed or reinterpolated. A preferred method of reassigning values to data points which are rejected under equation 1 is as follows:

(a) Check to see if the amplitude of the last good data point and the next data point which is good both have the same polarity (+or −). If this is the case, then a straight line intepolation is used between the last good and first good data point.

(b) If the number of consecutive bad data points exceeds an arbitrary number or if a polarity reversal occurs between the last good and first good data points, then the amplitude of the data points are set to zero.

Steps 1–8 or a desired portion of Steps 1–8 may be repeated several times for the same data if desired. Such multiple passes results in an improved removal of noise.

The following examples are presented in further illustration of the invention.

EXAMPLE 1

Figure 2:
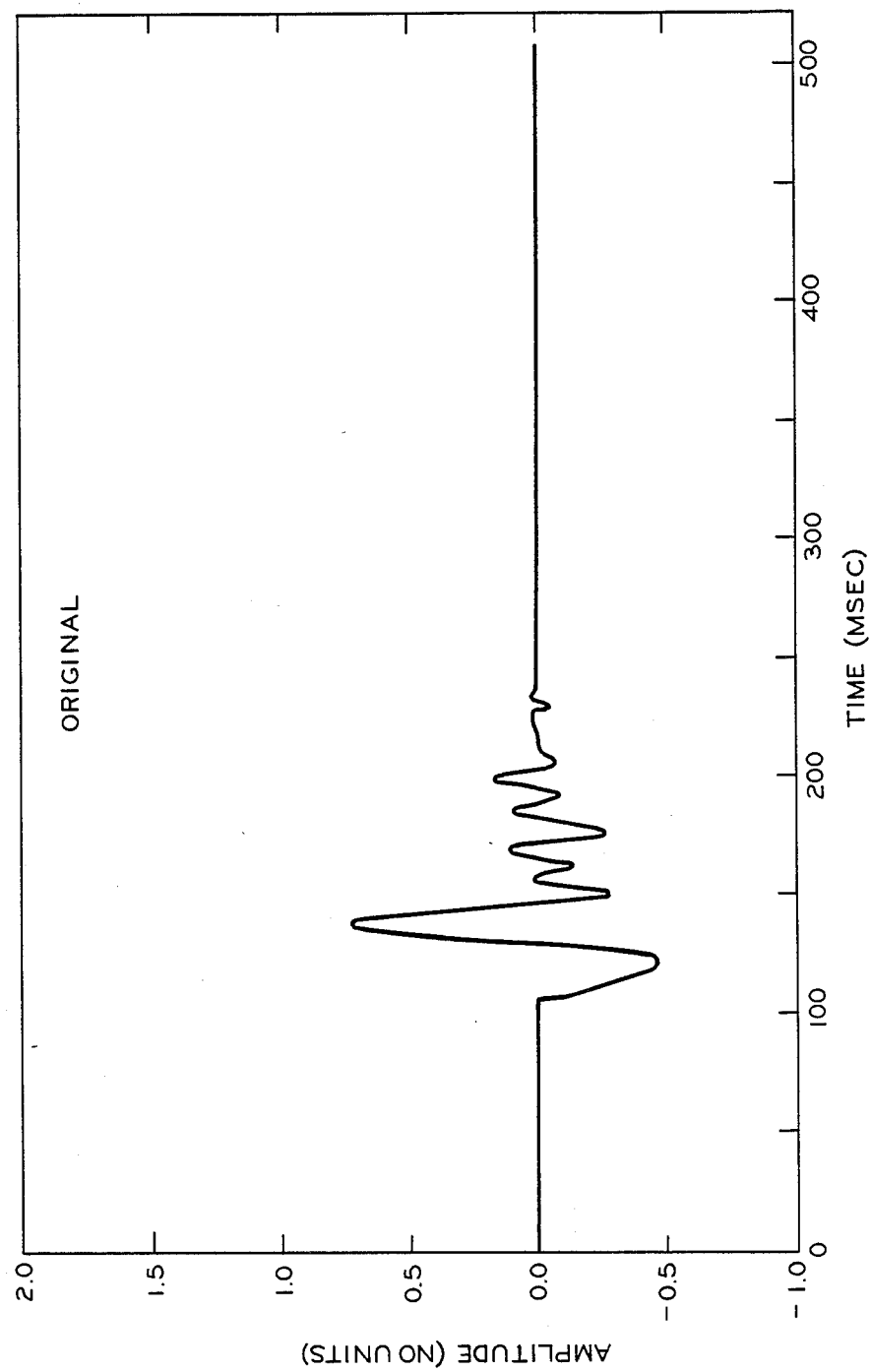
FIG. 2 illustrates a computer generated sinusoidal data trace.
Figure 3:
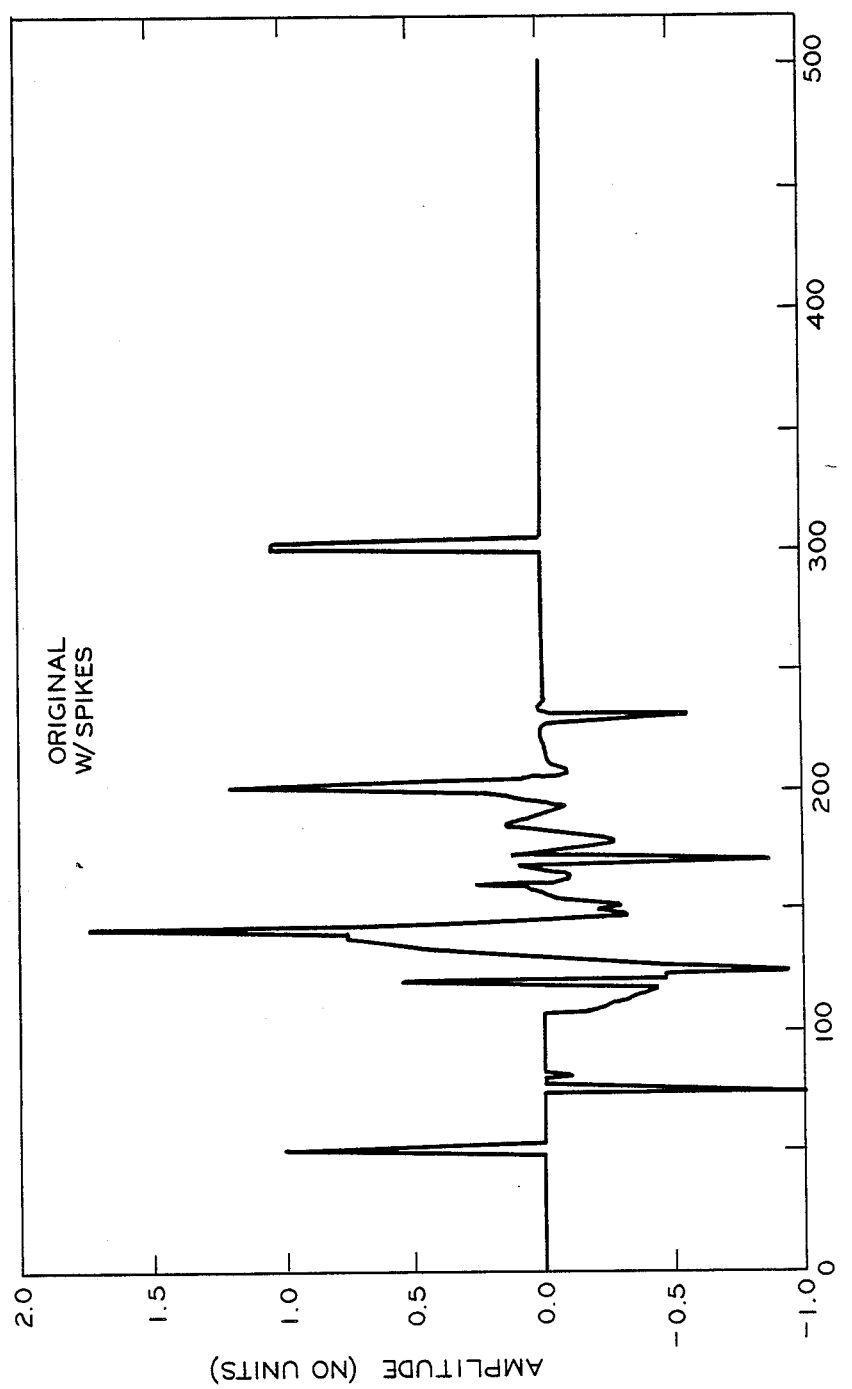
FIG. 3 illustrates the data trace of FIG. 2 with random noise spikes added.
Figure 4:
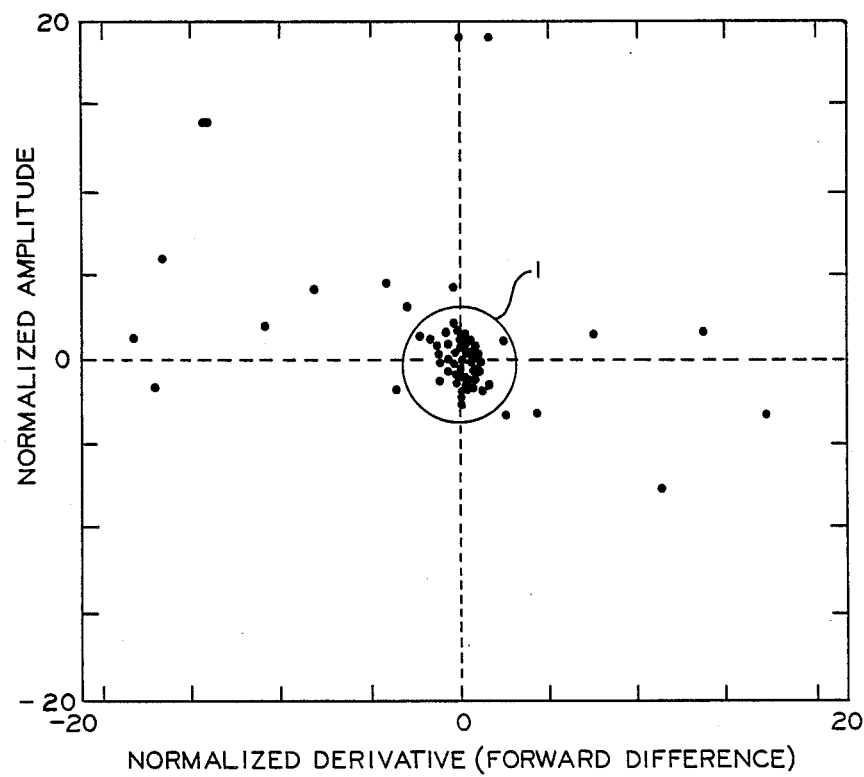
FIG. 4 illustrates a normalized derivative versus normalized amplitude crossplot of the data trace illustrated in FIG. 3.

FIG. 2 illustrates a computer generated sinusoidial data trace. In FIG. 3, random noise spikes have been added to the trace illustrated in FIG. 2. FIG. 4 illustrates a normalized derivative versus normalized amplitude crossplot of the trace illustrated in FIG. 3. The sample rate was 4 msec.

Figure 5:
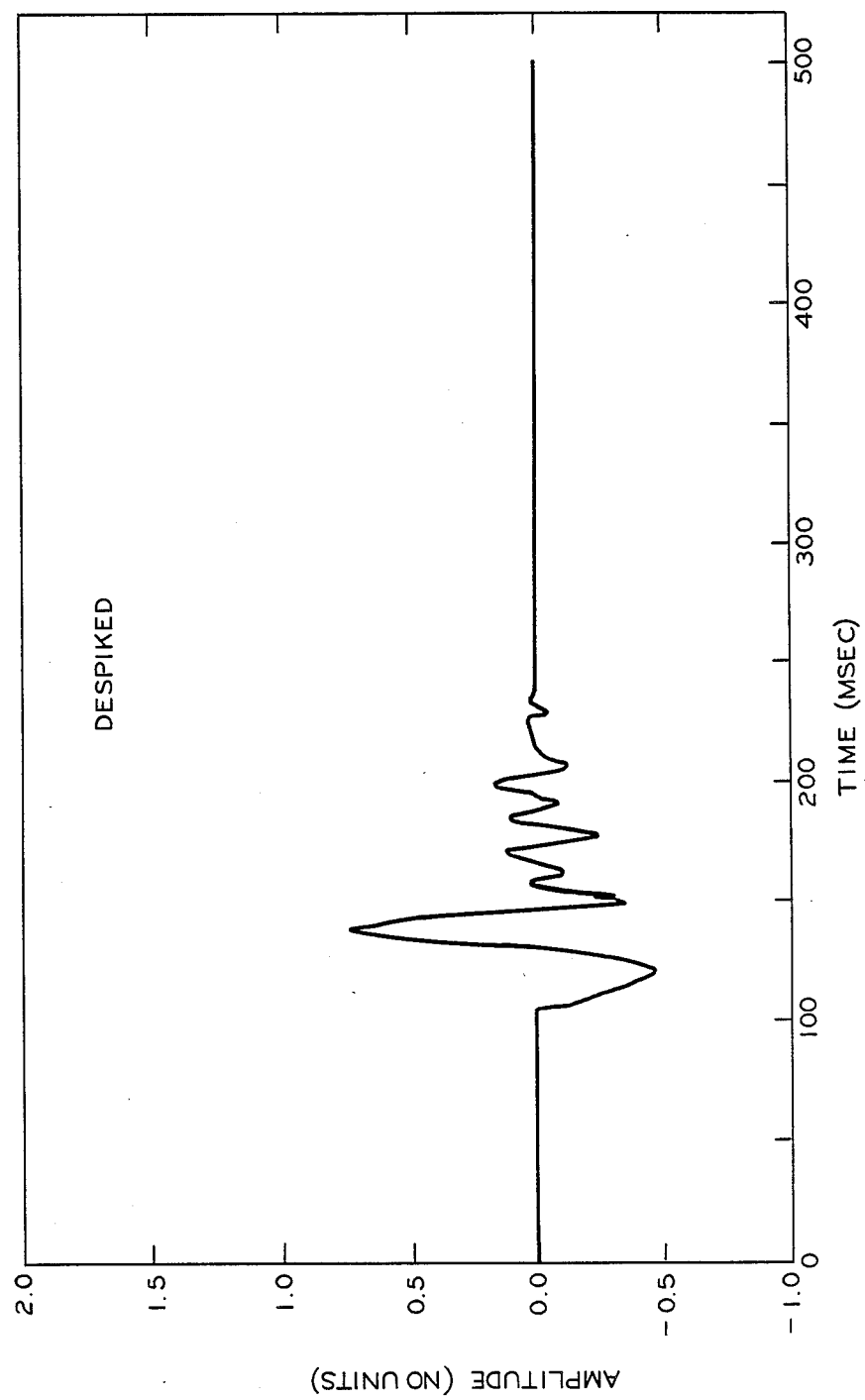
FIG. 5 illustrates the trace of FIG. 3 reconstructed in accordance with the present invention.

Data points outside the rejection circle 1 illustrated in FIG. 4 represent noise. These data points were treated according to the procedure described in Step 8. After such treatment, the trace was regenerated and is illustrated in FIG. 5. It can be seen that the reconstructed data of FIG. 5 compares very favorably with the original data of FIG. 2.

EXAMPLE 2

In this example, the effectiveness of the present invention with respect to methods based on only amplitude or only derivative is illustrated.

Figure 6:
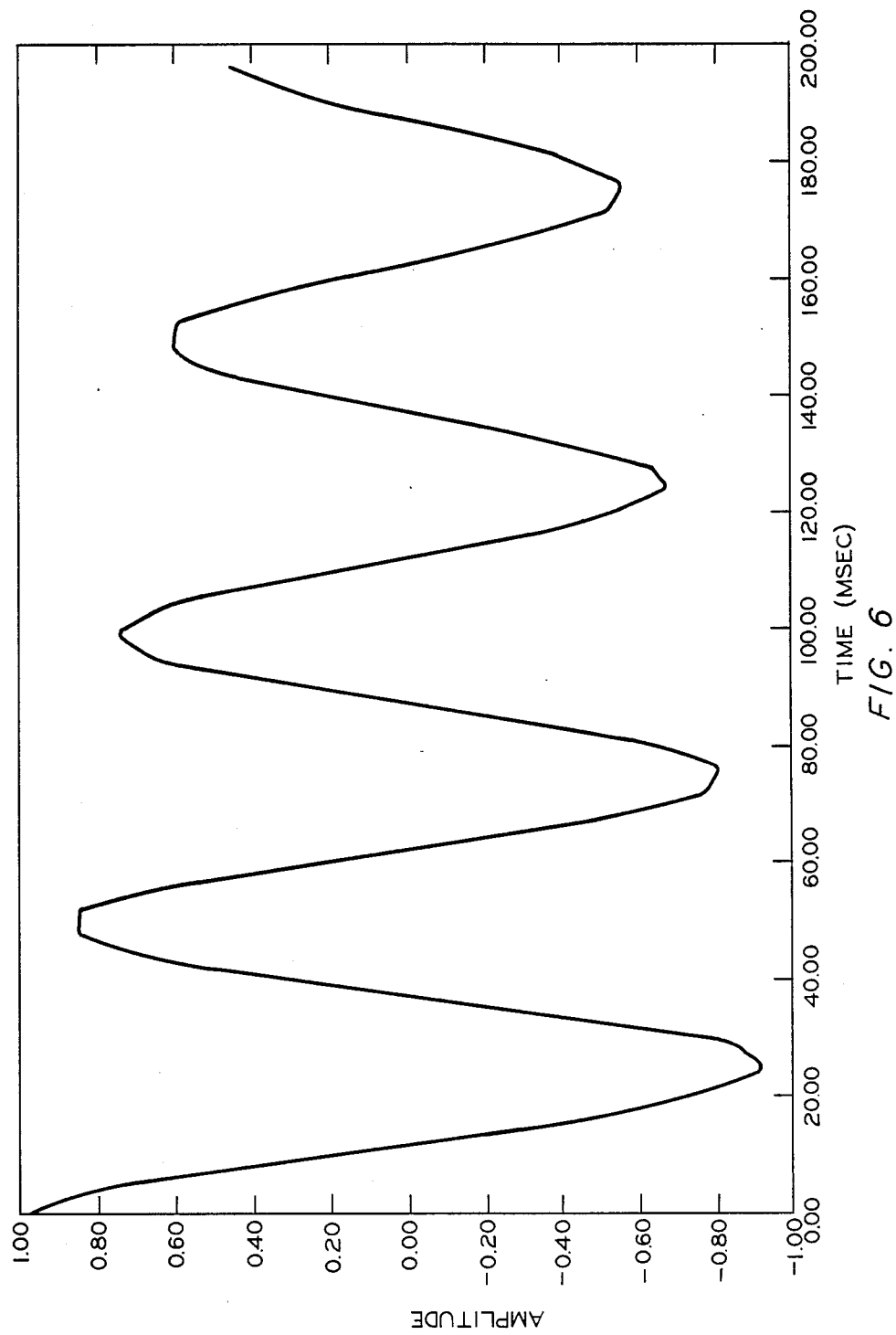
FIG. 6 shows a linearly damped 20 Hertz cosine wave.
Figure 7:
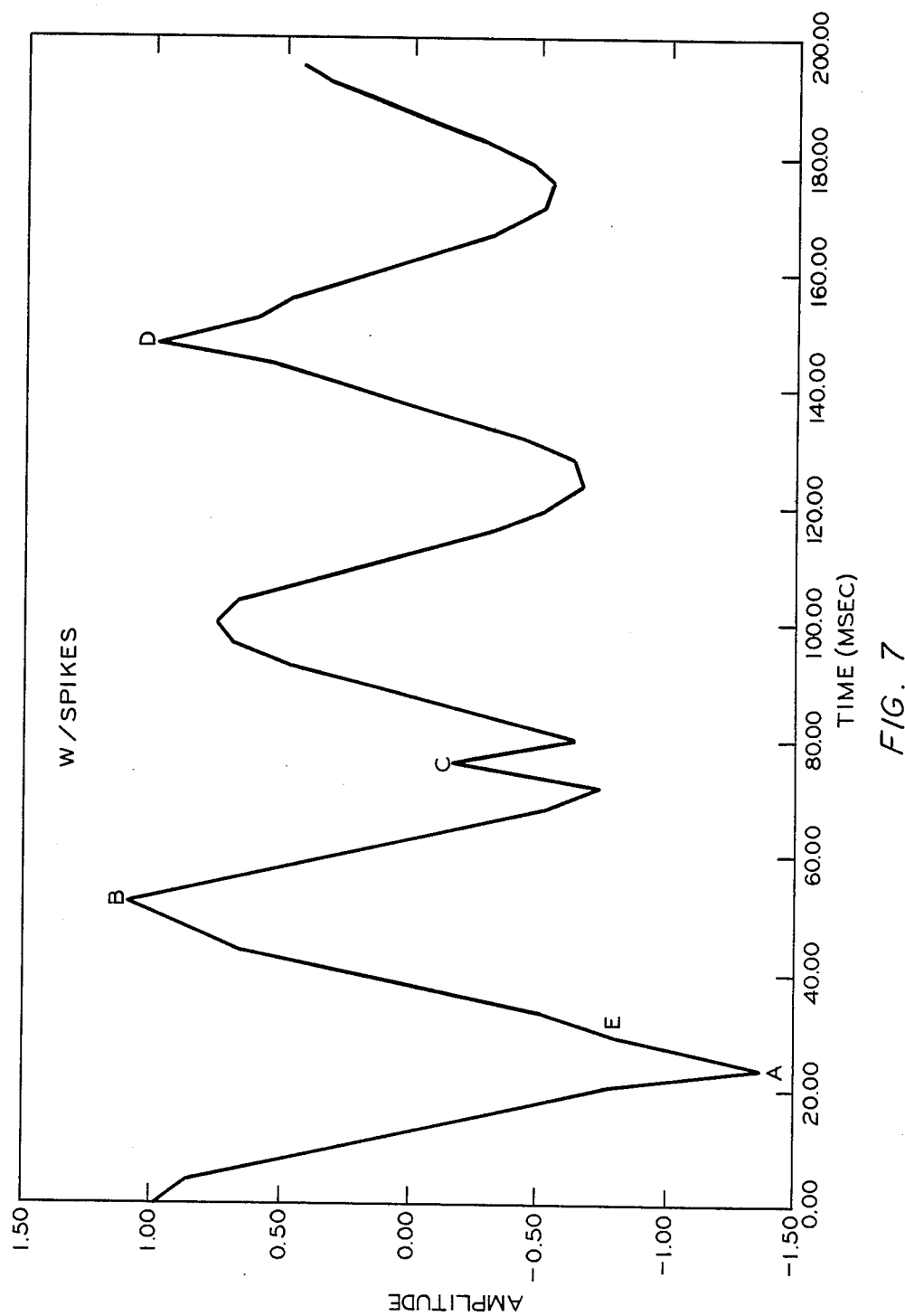
FIG. 7 illustrates the cosine wave of FIG. 6 with noise added.
Figure 8:
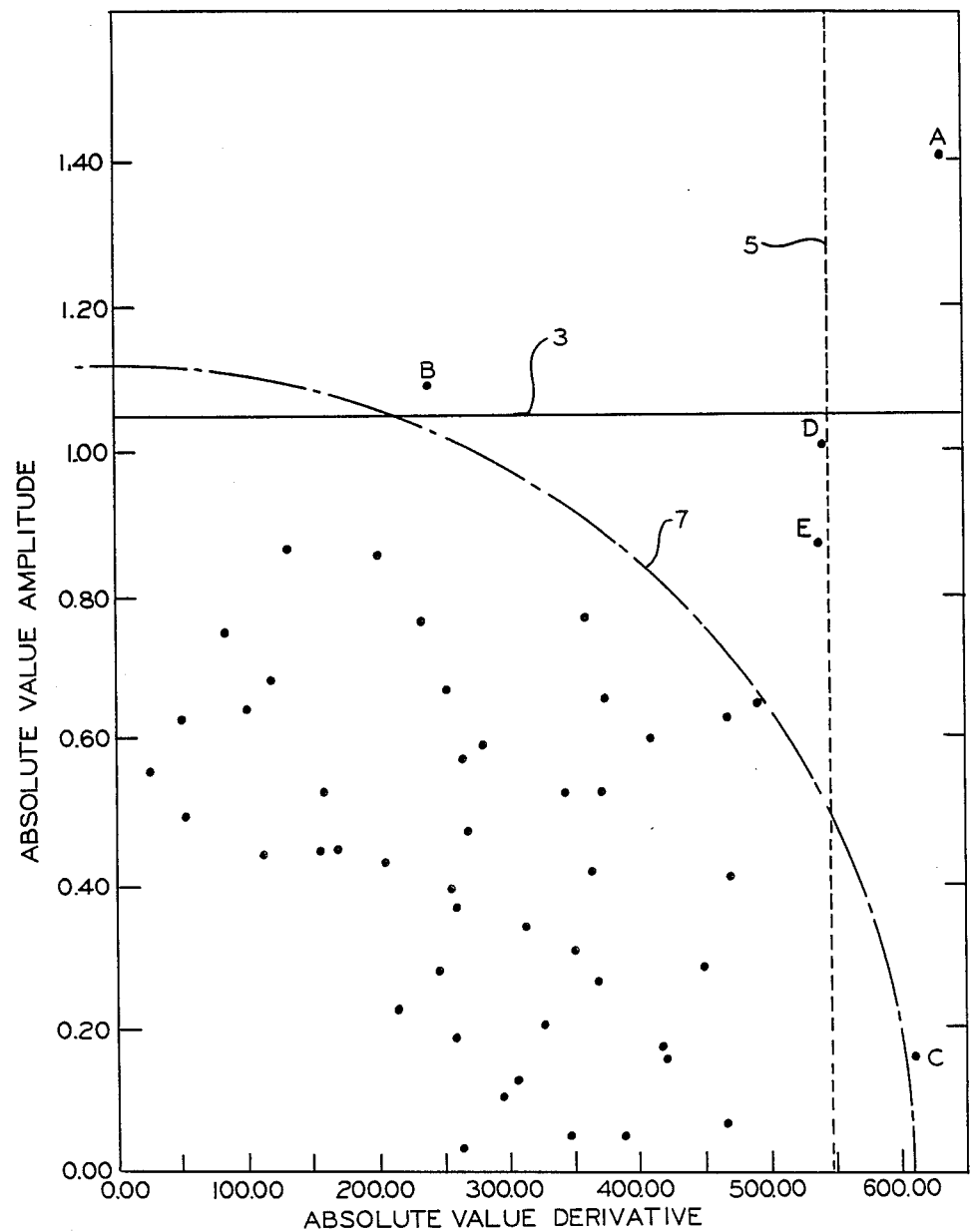
FIG. 8 illustrates a crossplot of the absolute value of derivative versus amplitude for the wave form illustrated in FIG. 7.

FIG. 6 shows a linearly damp 20 Hertz cosine wave. In FIG. 7, four anomalous, subtle spikes have been added at points A, B, C and D. A crossplot of the absolute value of derivative versus amplitude for the waveform illustrated in FIG. 7 is illustrated in FIG. 8. All data is in the first quadrant.

Referring now to FIG. 8, the maximum amplitude of the trace will be 1 and, allowing for some variation, the acceptable maximum amplitude has been assumed to be 1.05. The maximum derivative of the trace will be 0.5 and, allowing for some variation, the acceptable maximum derivative has been assumed to be 0.55. These acceptable values are indicated by values below and/or to the left of the lines 3 and 5, respectively. Point A is rejected by either amplitude or derivative as it lies above the 1.05 horizontal line 3 and to the right of the 0.55 vertical line 5. Point B is rejected by amplitude criteria but not by derivative criteria. Conversely, Point C is rejected by derivative criteria only. Point D is marginal and is not rejected by either amplitude or slope criteria alone or in combination. By use of the invention method the rejection radius 7 in FIG. 8 allows larger variation allowances for the acceptable values (1.1 for the amplitude and 0.6 for the derivative).

Even at these higher acceptance values, points A, B, C and D all are eliminated by the rejection radius defined by an arc connecting the maximum acceptable derivative 0.6 and the maximum acceptable amplitude 1.1.

It is noted that the arc illustrated in FIG. 8 resulted in the elimination of Point E which is a good data point. If desired, such elimination can be overcome if the slope calculation at Point E is based upon a reasonable revalued amplitude, as defined in Step 8, at Point A (i.e., fix each spike as it is encountered). Thereafter point E should fall within the rejection radius area.

EXAMPLE 3

Figure 9:
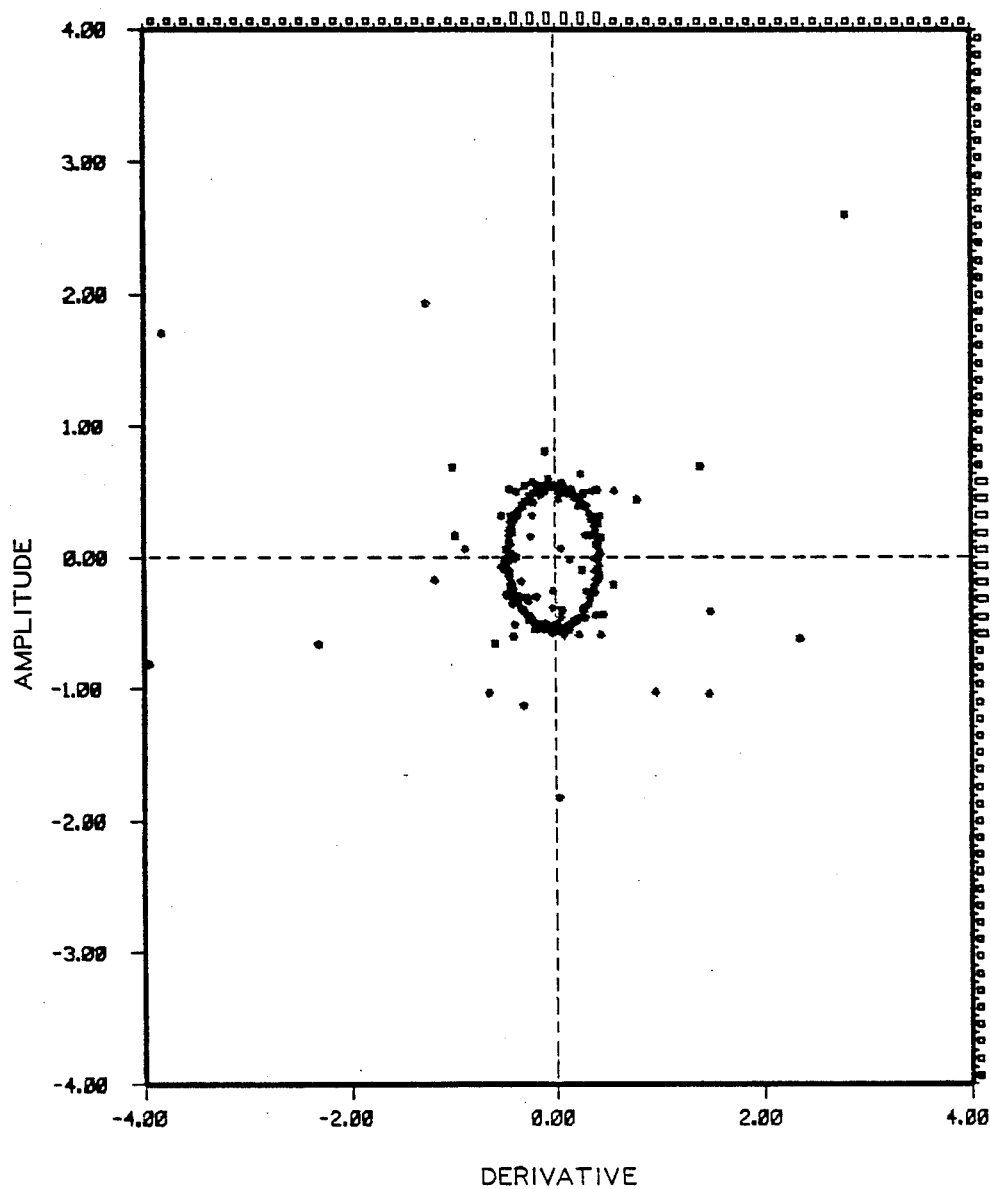
FIG. 9 illustrates the affect of crossplotting data which is not normalized.
Figure 10:
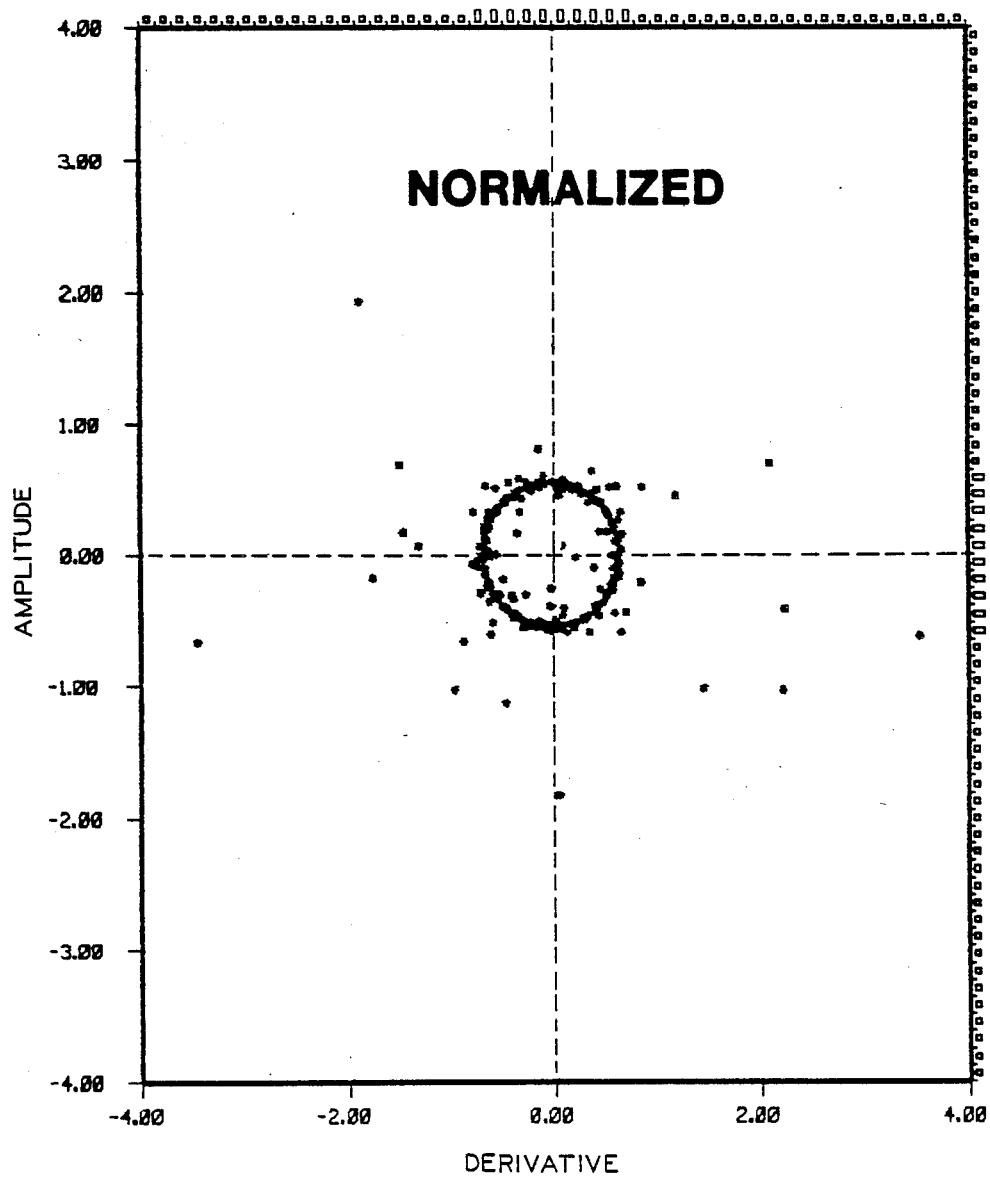
FIG. 10 illustrates a crossplot for the data of FIG. 9 where the data is normalized.

As was stated in the discussion of Step 1 above, normalizing is preferred but is not required. FIGS. 9 and 10 illustrate the effect of normalization. In FIG. 9 the crossplotted data was not normalized. In FIG. 10 the same data plotted in FIG. 9 was normalized and then crossplotted. The ellipse formed by the data of FIG. 9 has become nearly circular in FIG. 10. The ellipse and circle in the figures are not actual rejection radii but only data point clusters.

There are two advantages to the normalization which are as follows:

(a) The rejection line can be circular i shape which is a simpler equation to deal with than a ellipse which would be required for the crossplot of FIG. 9.

(b) Normalization can be performed over discreet windows such that valid high amplitudes in one part of a trace are proportionately compared to weak amplitudes in other parts of the trace.

It is noted that, in FIGS. 9 and 10, the data is shown as clustered along an ellipse or a circle. In real seismic data this would generally not be the case. The wide variation of amplitudes and frequencies cause the crossplotted points to cluster within a central area rather than plot along an ellipse or a circle. However, noise values still migrate outside the central area.

EXAMPLE 4

Figure 12:
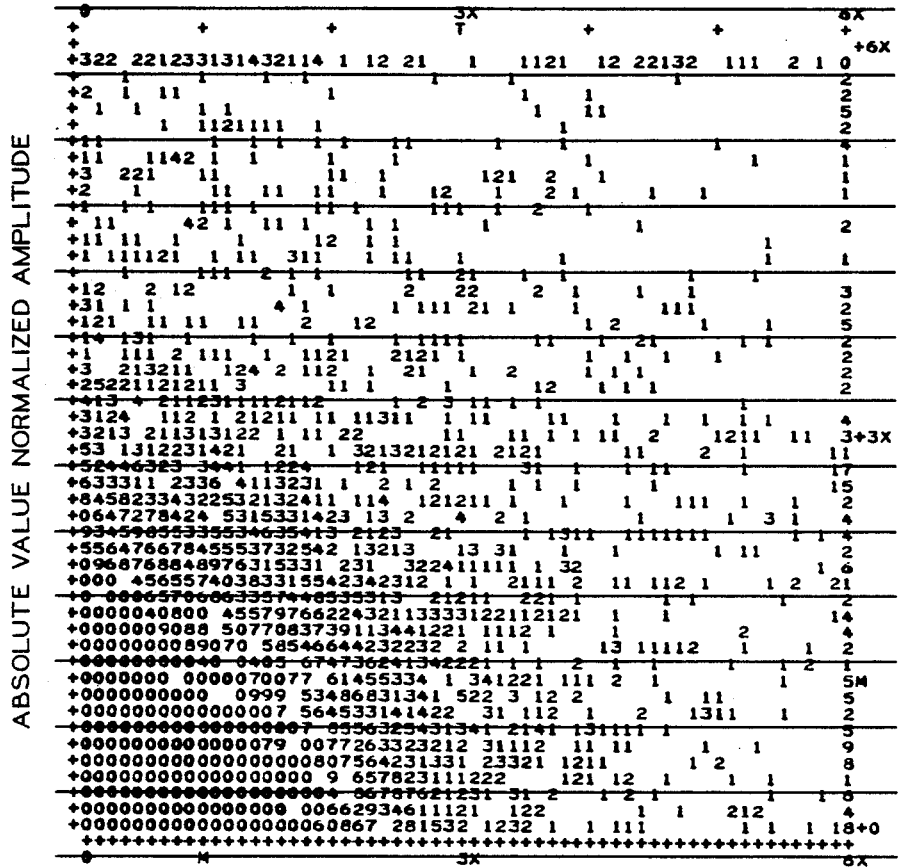

FIGS. 11 and 12 are actual printouts, representative of the absolute values of normalized amplitude and absolute values of normalized derivative of a trace, produced by the computer programs described hereinafter. These figures illustrate the effect of the normalizing window length. The dta crossplotted in each case is identical with the numbers representing the number of data points at that matrix location. For example, 0 means 10 or more data points at that location. It can be seen that, at the greater window length, the percentage of the data rejected for any given rejection radius is greater.

In FIGS. 11 (500 ms window) and 12 (1000 ms window), M on each axis refers to the normalizing constant value described in Step 3 above. 3 X refers to 3 times M (the normalizing constant value selected in Step 3 above). The rejection radius then is selected between 3 to 6 times M.

Only the first quadrant contains data in FIGS. 11 and 12 since the absolute values are used.

EXAMPLE 5

Figure 13:
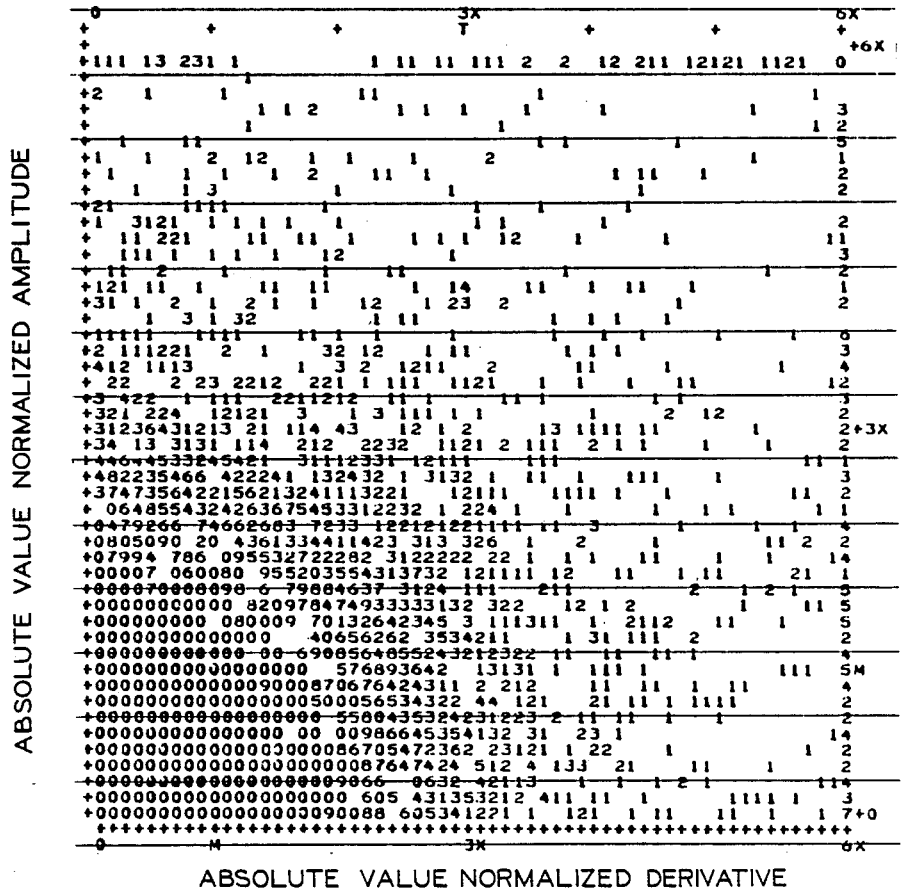
FIGS. 13, 14 and 15 illustrate the affect of utilizing normalized average derivative to normalized average amplitude ratios other than 1.0.
Figure 14:
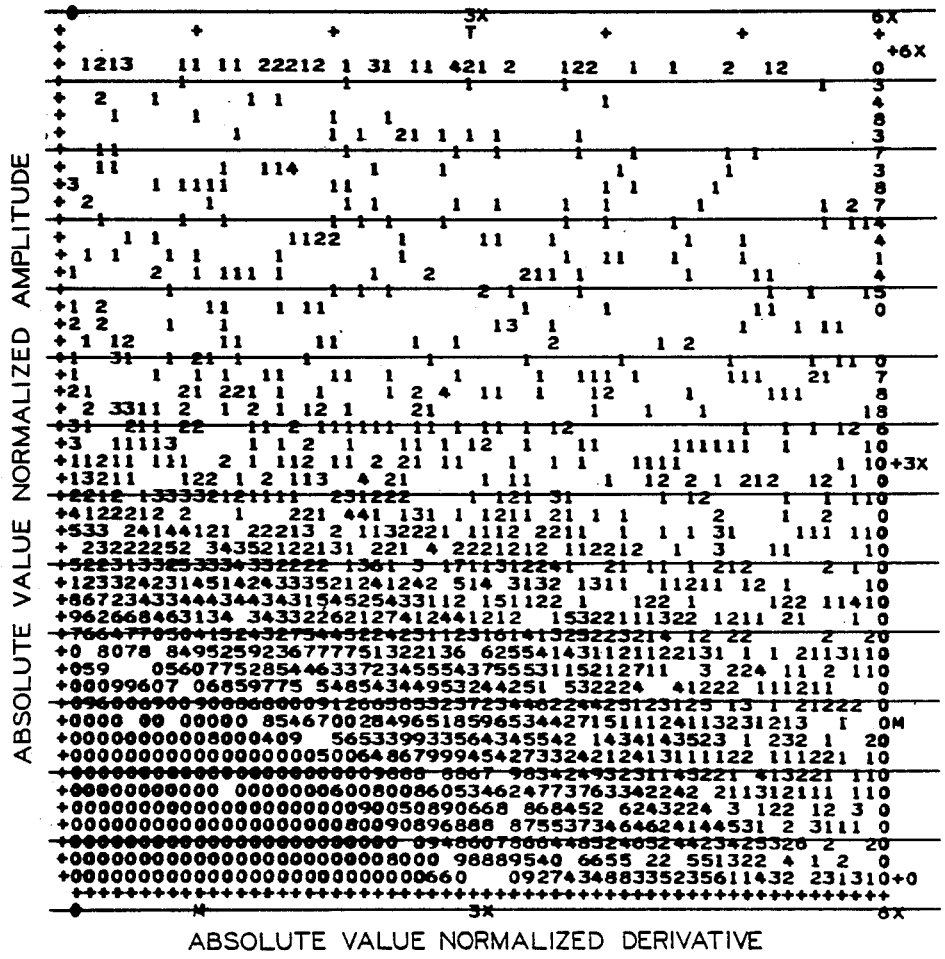
Figure 15:
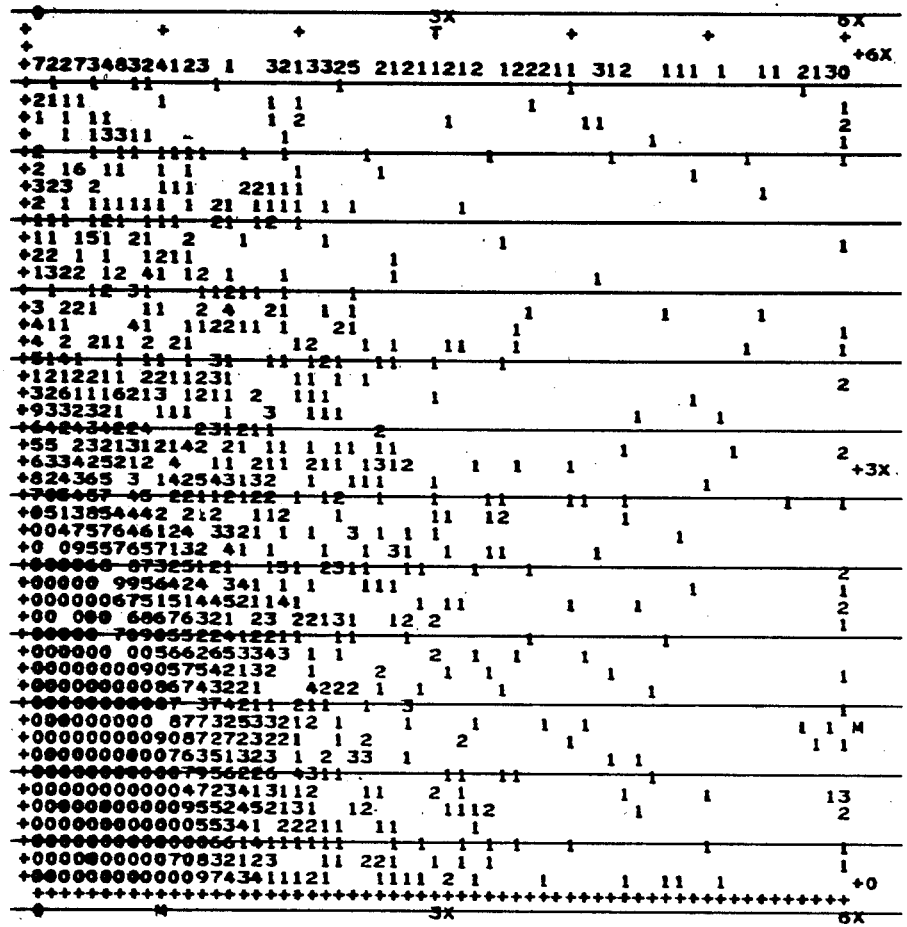

As was stated in Step 5 described above, the derivative and amplitude are preferably normalized to the same normalizing constant such that the normalized average derivative to normalized average amplitude ratio is equal to 1.0. The effect of using different ratios is illustrated in FIGS. 13, 14 and 15 which are similar to FIGS. 11 and 12. It can be seen that doubling the ratio, which is illustrated in FIG. 14, results in a higher rejection of data. The data clusters move along the derivative axis thus causing more rejection due to the derivative criteria.

In FIG. 14 halving of the ratio also results in a higher rejection of data due to the clustering of the data along the amplitude axis (amplitude criteria). The use of nonunity ratios will cause the rejection criteria to be more amplitude dependent for ratios less than 1.0 or more derivative dependent for ratios greater than 1.0.

EXAMPLE 6

As has been previously stated, multiple passes may be desirable. If spikes are included in the normalization calculation, such spikes can cause the average to be excessive.

Figure 16:
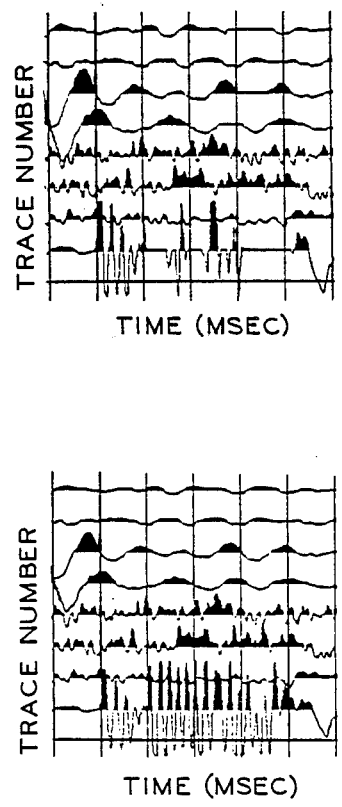
FIG. 16 is an illustration of multiple passes on seismic data containing noise in accordance with the present invention.

An example of a multiple pass is illustrated in FIG. 16. The effect of the multiple pass is particularly pronounced for the seismic wiggle trace at the left.

SUMMATION

In summary, it has been found that a crossplot of amplitude versus derivative can be utilized to locate data points which are affected by noise. Once located, the effect of noise on such data points can be removed. The advantages of the removal of noise from the seismic data prior to data processing are extremely significant as has been previously described.

The preferred computer program for accomplishing Steps 1–8 which crossplots the seismic data and then remove noise from the seismic data is set forth in Appendix 1. The computer program is written for an IBM 4341 computer manufactured by IBM and is self explanatory to one skilled in the use of the IBM 4341 computer. The input required into the computer program is the seismic data, in digital form, the window length, the window start time, the sample rate and the derivative-/amplitude ratio.

Figure 17:
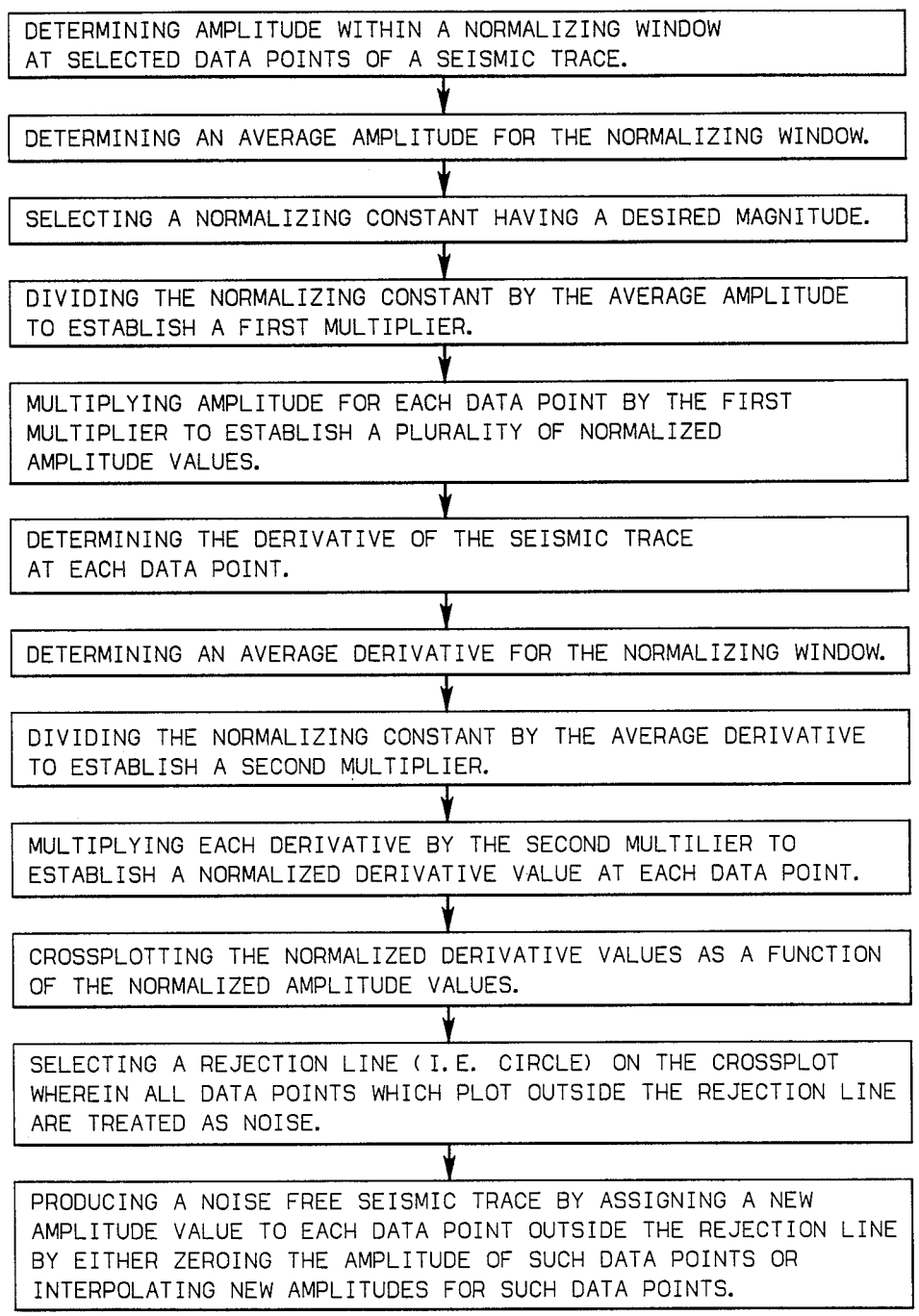
FIG. 17 is a flow chart which illustrates various steps of a preferred embodiment of the invention.

Referring finally to FIG. 17, there is shown a flow chart which sets forth the various steps in accordance with a preferred embodiment of the invention described above.

The invention has been described in terms of a preferred embodiment. Reasonable variations are possible especially with respect to the next steps utilized to perform the crossplot. Such variations are within the scope of the present invention.

APPENDIX I

```
**** TSO FOREGROUND HARDCOPY ****
DSNAME=A.GPI.UTIL.SOURCE                              (DSPIKE2 )

//$NFBDSP  JOB  999,NFB,
//    MSGLEVEL=(1,1),
//    TIME=(5,0),
//    REGION=850K,
//    MSGCLASS=Y,
//    NOTIFY=$NFB
//*MAIN FETCH=NONE
//STEP1 EXEC PLIXCL,
//    PARM.PLI='OPT(2),X,A,OF,MARGINS(2,72,1),LINECOUNT(55),MAP,NEST',
//    PARM.LKED='LIST,LET,MAP'
//PLI.SYSIN DD *
* PROCESS MAR(2,72,1);
 DSPIKE: PROC OPTIONS(MAIN);

/* MAIN MODULE OF PROGRAM TO DESPIKE DATA AND GENERATE CROSSPLOT  */
 /* OF DESPIKE INFORMATION                                         */

/* INPUT VARIABLES */
         /*  ID                -  CARD TYPE IDENTIFIER WILL BE CP OR DP*/
         /*  FIRST_DP_RECORD   -  FIRST RECORD FOR DESPIKING            */
         /*  LAST_DP_RECORD    -  LAST RECORD FOR DESPIKING             */
         /*  DP_NOR_WIND       -  NORMILIZING WINDOW FOR DESPIKING      */
         /*  REJECTION_FACTOR                                           */

DCL  ID                 CHAR(2)         INIT('  ');
         DCL  FIRST_DP_RECORD    FIXED BIN(31,0) INIT(0);
         DCL  LAST_DP_RECORD     FIXED BIN(31,0) INIT(0);
         DCL  DP_NOR_WIND        FIXED BIN(31,0) INIT(0);
         DCL  REJECTION_FACTOR   FLOAT(6)        INIT(0);
         DCL  DR                 FLOAT(6)        INIT(1);
         DCL  SAMPLE_RATE        FIXED BIN(31,0) INIT(0);
         DCL  NT                 FIXED BIN(15,0) INIT(0);
         DCL  PRINT              FIXED BIN(15,0) INIT(0);
         DCL  FB(100)            FIXED BIN(31,0) INIT((100)0);
         DCL  TRACE#(100)        FIXED BIN(31,0) INIT((100)0);
```

/* INTERNAL VARIABLES */

```
DCL REJECTION_RADIUS  FIXED BIN(31,0)  INIT(0);
DCL NFB               FIXED BIN(15,0)  INIT(0);
DCL DP                CHAR(2)          INIT('DP');
DCL DP_REQUESTED      FIXED BIN(15,0)  INIT(0);
DCL ZT                FIXED BIN(31,0)  INIT(0);
DCL PT                FIXED BIN(31,0)  INIT(0);
DCL FIRST_FLAG        FIXED BIN(31,0)  INIT(0);
DCL LENGTH            FIXED BIN(31,0)  INIT(0);
DCL NC                FIXED BIN(15,0)  INIT(0);
DCL NS                FIXED BIN(31,0)  INIT(0);
DCL INDEX             FIXED BIN(31,0)  INIT(0);
DCL I                 FIXED BIN(15,0)  INIT(0);
DCL J                 FIXED BIN(15,0)  INIT(0);
DCL L                 FIXED BIN(15,0)  INIT(0);
DCL M                 FIXED BIN(15,0)  INIT(0);
DCL N                 FIXED BIN(15,0)  INIT(0);
DCL TEMP              FIXED BIN(15,0)  INIT(0);

DCL LOOP              FIXED BIN(15,0)  INIT(0);
DCL FLAG              FIXED BIN(15,0)  INIT(0);
DCL EOF               FIXED BIN(15,0)  INIT(0);
DCL FN                FIXED BIN(15,0)  INIT(0);
DCL LN                FIXED BIN(15,0)  INIT(0);
DCL DUMMY             CHAR(70);

/*BRING IN TRACE STRUCTURE*/
DECLARE
  1 TRACE_ID_HEADER BASED(TRA_INP_PNTR),
    2 TRA_SEQ_NUM_LINE      FIXED BIN(31,0),
    2 TRA_SEQ_NUM_REEL      FIXED BIN(31,0),
    2 FILE_NUM              FIXED BIN(31,0),
    2 TRACE_NUM             FIXED BIN(31,0),
    2 ENERGY_SO_PT_NUM      FIXED BIN(31,0),
    2 SHOT_POINT            FIXED BIN(31,0),
    2 BLANK1                CHAR(4) INIT(' '),
    2 TRA_ID_CODE           FIXED BIN(15,0),
    2 BLANK2                CHAR(2) INIT(' '),
    2 BLANK3                CHAR(2) INIT(' '),
    2 DATA_USE              FIXED BIN(15,0),
    2 BLANK4                CHAR(12) INIT(' '),
    2 SOURCE_DEPTH          FIXED BIN(31,0),
    2 BLANK5                CHAR(54) INIT(' '),
    2 TIME_BRK_DIFF         FIXED BIN(15,0),
    2 BLANK6                CHAR(6) INIT(' '),
    2 NUM_SAMP              FIXED BIN(15,0),
    2 SAMP_INTERV           FIXED BIN(15,0),
    2 GAIN_TYPE             FIXED BIN(15,0),
    2 INSTR_GAIN            FIXED BIN(15,0),
    2 BLANK7                CHAR(18) INIT(' '),
    2 ALIAS_FILT_FREQ       FIXED BIN(15,0),
    2 ALIAS_FILT_SLOPE      FIXED BIN(15,0),
    2 NOTCH_FILT_FREQ       FIXED BIN(15,0),
    2 BLANK8                CHAR(10) INIT(' '),
    2 YEAR                  FIXED BIN(15,0),
    2 DAY                   FIXED BIN(15,0),
    2 HOUR                  FIXED BIN(15,0),
    2 MINUTE                FIXED BIN(15,0),
    2 SECOND                FIXED BIN(15,0),
    2 TIME_BASIS_CODE       FIXED BIN(15,0),
    2 BLANK9                CHAR(12) INIT(' '),
    2 REM_TELE_UNIT_NUM     FIXED BIN(15,0),
    2 REM_TELE_CHAN_NUM     FIXED BIN(15,0),
    2 BLANK10               CHAR(54) INIT(' '),
    2 TRACE_REFER1          FIXED BIN(15,0);

DECLARE
  1 TRACE_DATA        BASED(TRA_PNTR),
    2 NMB_SAMP        FIXED BIN (15,0),
    2 A(II REFER(NMB_SAMP)) FLOAT DEC(6,0);

DCL TRACE(8000) FLOAT(6) BASED(TRA_INP_PNTR);
DCL TRACI(8000) FIXED BIN(15,0);

/* DECLARE POINTERS */
DCL (TRA_INP_PNTR,
     TRA_PNTR,
     FS_PNTR
    ) PTR;
```

```
     DCL SUBSTR BUILTIN;
     DCL ADDR BUILTIN;
     DCL READTP EXTERNAL ENTRY ((*)FIXED BIN(15),FIXED BIN(31));
     DCL TAPEOUT EXTERNAL ENTRY ((*)FIXED BIN(15),FIXED BIN(31,0));
     DCL DESPIKE EXTERNAL ENTRY
                  (PTR,PTR,FIXED BIN(31),FIXED BIN(31),
                   FIXED BIN(31),FIXED BIN(31),FIXED BIN(15),
                   PTR,FLOAT,FIXED BIN(15));
     TRA_INP_PNTR = ADDR(TRACI);
     FB_PNTR = ADDR(FB(I));

/* END OF FILE */
 ON ENDFILE(SYSIN) BEGIN;
     PUT SKIP EDIT('DATA ERROR  ABORT   DSPIKE') (A);
     STOP;
 END;

/* INPUT PARMS */

GET FILE(SYSIN) EDIT(ID) (A(2));

/* TEST FOR DESPIKING */

IF ID = DP THEN DO;

DP_REQUESTED = 1;

GET FILE(SYSIN) EDIT(FIRST_DP_RECORD,
                             LAST_DP_RECORD,
                             DP_NOR_WIND,
                             REJECTION_FACTOR,
                             SAMPLE_RATE,
                             NT,
                             DR,
                             ZF,
                             PRINT)
                (F(4),F(4),F(5),F(5,2),F(1),F(3),
                 F(3,1),F(2),F(1));
        PUT SKIP EDIT('DESPIKING REQUESTED') (A);
        PUT SKIP EDIT('FIRST RECORD FOR DESPIKE IS ',
                       FIRST_DP_RECORD) (A,F(4));
        PUT SKIP EDIT('STOP RECORD FOR DESPIKE IS ',
                       LAST_DP_RECORD) (A,F(4));
        PUT SKIP EDIT('DESPIKE NORMALIZING WINDOW IS',
                       DP_NOR_WIND,' MS')
                (A,F(5),A);
        PUT SKIP EDIT('REJECTION FACTOR FOR DESPIKE IS',
                       REJECTION_FACTOR) (A,F(5,2));
        PUT SKIP EDIT('SAMPLE RATE IS ',SAMPLE_RATE,' MS')
                (A,F(1),A);
        PUT SKIP EDIT('NUMBER OF TRACES IS',NT) (A,F(4));
        IF DR = 0 THEN DR = 1E+0;
        PUT SKIP EDIT('RATIO OF DERIVATIVE MEAN TO AMPLITUDE MEAN ',
                       DR) (A,F(3,1));
        IF ZF = 0 THEN ZF = 10;
        PUT SKIP EDIT('CONSECTIVE SPIKES ALLOWED BEFORE ZEROING',
                       ZF) (A,F(3));
        IF PRINT = 1 THEN DO;

PUT SKIP EDIT('SPIKE LOCATION PRINT REQUESTED') (A);
        END;
        ELSE DO;
           PUT SKIP EDIT('NO SPIKE LOCATION PRINT REQUESTED') (A);
        END;

END;
     ELSE DO;
        PUT SKIP EDIT('DESPIKE NOT REQUESTED -ABORT  DSPIKE') (A);
        STOP;
     END;

/* INPUT FIRST BREAK TRACE NUMBERS AND TIME */
```

```
          M = 3;
          N = 4;
          DO J = 1 TO 10 WHILE (EOF=0);
             GET FILE (SYSIN) EDIT(DUMMY) (COL(1),A(70));
             L = 1;
             DO I = 1 TO 10 WHILE(FLAG=0);
                INDEX = SUBSTR(DUMMY,L,M);
                IF INDEX > NT THEN DO;
                   PUT SKIP EDIT('TRACE NUMBER OUT OF RANGE ABORT DSPIKE')
                           (A);
                   STOP;
                END;
                TRACE#(INDEX) = INDEX;
                L = L + 3;
                FB(INDEX) = SUBSTR(DUMMY,L,N);
                IF INDEX ¬= 0 THEN NFB = NFB + 1;
                IF INDEX = NT THEN EOF = 1;
                L = L + 4;
                IF SUBSTR(DUMMY,L,M) = '    ' THEN FLAG = 1;
             END;
          END;
          LN = 1;
          DO I = 2 TO NT;
             IF FB(I) = 0 & LN = 1 THEN FN = I-1;
             IF FB(I) = 0 THEN LN = LN + 1;
             IF FB(I) = 0 THEN GO TO CONT1;
             IF LN > 1 THEN DO;
                LN = LN + FN;
                DO J = FN+1 TO LN -1;
                   FB(J) = (((FB(LN)-FB(FN))/(LN-FN))*(J-FN)) + FB(FN);
                END;
                LN = 1;
             END;
CONT1:    END;
          DO I = 1 TO NT;
             FB(I) = FB(I)/SAMPLE_RATE;
          END;
          PUT SKIP EDIT('FIRST BREAKS IN SAMPLES:') (A);
          PUT SKIP EDIT((FB(I) DO I=1 TO NT)) (F(5));

/* CONVERT WINDOW TIME TO SAMPLES */
          DP_NOR_WIND = DP_NOR_WIND/SAMPLE_RATE;

/* COMPUTE REJECTION RADIUS */
          REJECTION_RADIUS = REJECTION_FACTOR*1E1;

/* INPUT TAPE RECORD */
CONT:     CALL READTP(TRACI,LENGTH);
          IF LENGTH = -1 THEN GO TO OUT;

IF DP_REQUESTED = 1 THEN DO;
             /* IF 3200 OR 400 BYTE RECORD WRITE TO OUTPUT */
             IF LENGTH = 3200 | LENGTH = 400 THEN DO;
                CALL TAPEOUT(TRACI,LENGTH);
                GO TO CONT;
             END;
             TRACE_REFER1 = NUM_SAMP + 1;
             TRA_PNTR = ADDR(TRACE_REFER1);
             A(NUM_SAMP+1) = A(NUM_SAMP);

/* TEST FOR FIRST RECORD FOR DESPIKE REQUESTED */
             IF FIRST_DP_RECORD = FILE_NUM | FIRST_DP_RECORD = 0
                                 THEN FIRST_FLAG = 1;
             IF LAST_DP_RECORD = FILE_NUM THEN FIRST_FLAG=-1;
             NS = NUM_SAMP;
             IF FIRST_FLAG > 0 THEN DO;
                CALL DESPIKE(TRA_INP_PNTR,TRA_PNTR,NS,DP_NOR_WIND,
                             REJECTION_RADIUS,ZT,PRINT,FB_PNTR,DR,ZF);
                NC = NC + 1;
                GO TO CONT;
             END;
             IF FIRST_FLAG = 0 THEN GO TO CONT;
             IF FIRST_FLAG=-1 THEN DO;
                PT = ZT*100/(NC*NS);
                PUT SKIP EDIT('SPIKE PERCENTAGE OF TOTAL DATA SET',PT)
                        (A,F(6));
             END;
          END;
OUT:      IF LENGTH = -1 THEN
             PUT SKIP EDIT('END OF FILE ENCOUNTERED  DSPIKE') (A);
```

```
        IF FIRST_FLAG = 1 THEN DO;
            PT = ZT*100/(NC*NS);
            PUT SKIP EDIT('SPIKE PERCENTAGE OF TOTAL DATA SETS',PT)
                (A,F(6));
            PUT SKIP EDIT('END OF JOB') (A);
        END;
        END; /* DSPIKE */
● PROCESS MAR(2,72,1);
  DESPIKE: PROC(TRA_INP_PNTR,TRA_PNTR,NS,W,R,ZT,PRINT,FB_PNTR,DR,ZF);

/* INPUT VARIABLES */
        /* TRACE_PNTR - LOCATION OF TRACE              */
        /* NS - NUMBER SAMPLES                         */
        /* LC - LAST RECORD TO DESPIKE                 */
        /* W  - NUMBER SAMPLE/NORMALIZING WINDOW       */
        /* R  - REJECTION RADIUS                       */
        /* ZT                                          */
        /* PRINT - PRINT SPIKE LOCATIONS               */
        /* FB_PNTR - FIRST BREAK LOCATIONS             */
        /* DR - RATIO OF DERIVATIVE TO AMPLITUDE       */
        /* ZF - MAX NUMBER OF CONSECTIVE SPIKES        */

DCL NS           FIXED BIN(31,0);
        DCL W            FIXED BIN(31,0);

DCL R            FIXED BIN(31,0);
        DCL ZT           FIXED BIN(31,0);
        DCL RI           FIXED BIN(31,0);
        DCL NC           FIXED BIN(31,0);
        DCL NW           FIXED BIN(31,0);
        DCL LS           FIXED BIN(31,0);
        DCL FS           FIXED BIN(31,0);
        DCL WC           FIXED BIN(31,0);
        DCL ZF           FIXED BIN(31,0);
        DCL SX           FIXED BIN(31,0);
        DCL FB(100)      FIXED BIN(31,0) BASED(FB_PNTR);
        DCL NS2          FIXED BIN(31,0) INIT(0);
        DCL AN(8000)     FLOAT(6);
        DCL D(8000)      FLOAT(6);
        DCL M(8000)      FIXED BIN(31,0);
        DCL AF           FLOAT(6);
        DCL AT           FLOAT(6);
        DCL DF           FLOAT(6);
        DCL DT           FLOAT(6);
        DCL X            FLOAT(6);
        DCL Y            FLOAT(6);
        DCL DR           FLOAT(6);
        DCL FF           FIXED BIN(15,0);
        DCL SC           FIXED BIN(15,0);
        DCL Z            FIXED BIN(15,0);
        DCL G            FIXED BIN(15,0);
        DCL H            FIXED BIN(15,0);
        DCL K            FIXED BIN(15,0);
        DCL J            FIXED BIN(15,0);
        DCL L            FIXED BIN(15,0);
        DCL I            FIXED BIN(15,0);
        DCL PRINT        FIXED BIN(15,0);
        DCL NBYTE        FIXED BIN(31,0);

/*BRING IN TRACE STRUCTURE*/
        DECLARE
          1 TRACE_ID_HEADER            BASED(TRA_INP_PNTR),
            2 TRA_SEQ_NUM_LINE         FIXED BIN(31,0),
            2 TRA_SEQ_NUM_REEL         FIXED BIN(31,0),
            2 FILE_NUM                 FIXED BIN(31,0),
            2 TRACE_NUM                FIXED BIN(31,0),
            2 ENERGY_SO_PT_NUM         FIXED BIN(31,0),
            2 SHOT_POINT               FIXED BIN(31,0),
            2 BLANK1                   CHAR(4) INIT(' '),
            2 TRA_ID_CODE              FIXED BIN(15,0),
            2 BLANK2                   CHAR(2) INIT(' '),
            2 BLANK3                   CHAR(2) INIT(' '),
            2 DATA_USE                 FIXED BIN(15,0),
            2 BLANK4                   CHAR(12) INIT(' '),
            2 SOURCE_DEPTH             FIXED BIN(31,0),
            2 BLANK5                   CHAR(54) INIT(' '),
            2 TIME_BRK_DIFF            FIXED BIN(15,0),
            2 BLANK6                   CHAR(6) INIT(' '),
            2 NUM_SAMP                 FIXED BIN(15,0),
            2 SAMP_INTERV              FIXED BIN(15,0),
```

```
            2 GAIN_TYPE              FIXED BIN(15,0),
            2 INSTR_GAIN             FIXED BIN(15,0),
            2 BLANK7                 CHAR(18) INIT(' '),
            2 ALIAS_FILT_FREQ        FIXED BIN(15,0),
            2 ALIAS_FILT_SLOPE       FIXED BIN(15,0),
            2 NOTCH_FILT_FREQ        FIXED BIN(15,0),

2 BLANK8                 CHAR(10) INIT(' '),
            2 YEAR                   FIXED BIN(15,0),
            2 DAY                    FIXED BIN(15,0),
            2 HOUR                   FIXED BIN(15,0),
            2 MINUTE                 FIXED BIN(15,0),
            2 SECOND                 FIXED BIN(15,0),
            2 TIME_BASIS_CODE        FIXED BIN(15,0),
            2 BLANK9                 CHAR(12) INIT(' '),
            2 REM_TELE_UNIT_NUM      FIXED BIN(15,0),
            2 REM_TELE_CHAN_NUM      FIXED BIN(15,0),
            2 BLANK10                CHAR(54) INIT(' '),
            2 TRACE_REFER1           FIXED BIN(15,0);
    DECLARE
          1 TRACE_DATA              BASED(TRA_PNTR),
            2 NMB_SAMP               FIXED BIN (15,0),
            2 A(II REFER(NMB_SAMP)) FLOAT DEC(6,0);

DCL TR_OUT(6000) FIXED BIN(15,0) BASED(TRA_INP_PNTR);

/* DECLARE POINTERS */
    DCL (TRA_INP_PNTR,
         TRA_PNTR,
         FB_PNTR
         ) PTR;
    DCL TAPEOUT EXTERNAL ENTRY((*)FIXED BIN(15), FIXED BIN(31));
    DCL ABS BUILTIN;
    DCL SIGN BUILTIN;
    DCL TRACE_PNTR PTR;
    DCL PLIDUMP BUILTIN;

RR = R*R;
    NS2 = NS - FB(TRACE_NUM);
    NW =NS2/W;
    WC = NW*W;
    NW = NS2/W + 1;
    IF NS2 > WC THEN NW = NW + 1;
    WC = 0;
/* CALCULATE DERIVATIVE MAGNITUDE BY FORWARD DIFFERENCE */

DO J = 1 TO NS;
       K = J + 1;
       D(J) = ABS(A(K) - A(J));
    END;

/* CALCULATE A WINDOW NORMALIZED AMPLITUDE AND DERIVATIVE */
/* CALCULATE WINDOW MEAN AMPLITUDE AND MEAN DERIVATIVE   */
/* CHECK FOR LAST WINDOW                                  */
    DO WHILE (WC < NW);
       WC = WC + 1;
       IF WC = NW THEN DO;
          LS = NS;
       END;
       ELSE DO;
          LS = (WC-1)*W + FB(TRACE_NUM);
       END;

FS = (WC-2)*W+1 +FB(TRACE_NUM);
       IF WC = 1 THEN DO;
          FS = 1;
          LS = FB(TRACE_NUM);
       END;

END; /* CALCULATE MEAN AMPLITUDE */
       AT = 0;
       DO K = FS TO LS;
          AT = AT + ABS(A(K));
       END;

IF AT <=0 THEN AT = 1;
       /* CALCULATE NORMALIZING FACTOR SO MEAN AMPLITUDE IS 10 */
       AF = 10*(LS-FS)/AT;
       /* NORMALIZE AMPLITUDES */
       DO K = FS TO LS;
          AN(K) = AF*ABS(A(K));
       END;
```

```
/* CALCULATE MEAN DERIVATIVE */
DT = 0;
DO K = FS TO LS;
    DT = DT + D(K);
END;
IF DT <= 0 THEN DT = 1;
/* CALCULATE NORMALIZING FACTOR SO MEAN DERIVATIVE IS 10 */
DF = DR*10*(LS-FS)/DT;
/* NORMALIZE DERIVATIVES */
DO K = FS TO LS;
    D(K) = DF*D(K);
END;

IF FS >= LS THEN WC=NW;

END; /* DO WHILE (WC> NW) */

/* ZERO FILL IF SPIKE LOCATIONS */
DO J = 1 TO NS;
    M(J) = 0;
END;

/* CHECK FOR SPIKES AND FLAG M FILE IF FOUND */
DO K = 1 TO NS;
    IF AN(K)**2 + D(K)**2 > RR THEN M(K) = 1;
END;

/* INTERPOLATE BETWEEN SPIKE VALUES */
/* TEST FOR SPIKE AT FIRST SAMPLE AND SET AMPLITUDE TO 0 */
IF M(1) = 1 THEN A(1) = 0;
J = 2;
DO WHILE (J<NS);
SC = 0;
FF = 0;

DO I = 1 TO NS;
    IF M(I) ¬= 0 THEN SC = 1;
END;
IF SC = 0 THEN GO TO PRNT;
SC = 0;
    /* FIND LOCATION OF FIRST SPIKE */
    DO WHILE(M(J) = 0);
        J = J + 1;
    END;

G = J-1;
        H = J;
        FF = FF + 1;/* COUNT SPIKES */

/* FIND NUMBER OF CONSECTIVE SPIKES */
        DO WHILE(M(J) = 1);
            J = J + 1;
            FF = FF + 1;
        END;
        /* J - 1 = LOCATION OF LAST SPIKE IN SEQ */
        /* G = LOCATION OF LAST VALUE BEFORE SPIKE */
        /*. H = LOCATION OF FIRST SPIKE IN SEQ */
        IF FF < 3 | FF >= ZF THEN DO;
            IF FF < 3 THEN DO;
                DO K = H TO J - 1;
                    A(K) = ((A(J) - A(G))*(K-G)/(J-G)) + A(G);
                END;
                FF = 0;
            END;
            ELSE DO;
                DO WHILE((SIGN(A(H)) = SIGN(A(G)))&(A(G) ¬= 0));
                    H = H - 1;
                    G = G - 1;
                END;

DO WHILE((SIGN(A(J-1)) = SIGN(A(J)))&(A(J) ¬= 0));
                    J = J + 1;
                END;
                DO I = H TO J - 1;
                    A(I) = 0;
                END;

FF = 0;
            END;
        END;
END;
```

```
              END;
         END;
     END;

/* PRINT SPIKE LOCATIONS */
PRNT:
         PUT SKIP EDIT('TRACE NUMBER',TRACE_NUM) (A,F(3));
         IF PRINT = 1 THEN
             PUT SKIP EDIT('SAMPLE NUMBERS OF SPIKES') (A);

Z = 0;
         DO K = 1 TO NS;
             IF M(K) = 1 THEN DO;
                 IF PRINT = 1 THEN
                     PUT SKIP EDIT(K) (F(4));
                 Z = Z + 1;
                 ZT = ZT + 1;
             END;
         END;

/* PRINT NUMBER OF SPIKES REJECTED */
         PUT SKIP EDIT('NUMBER OF SPIKES FOR THIS TRACE =',Z) (A,F(4));

/* WRITE DESPIKED TRACE TO TAPE */
         NBYTE = NS*4 + 240;
         CALL TAPEOUT(TR_OUT,NBYTE);
     END;
 PROCESS;
READTP: PROCEDURE(BUFFER,LENGTH);

/* THE FUNCTION OF THIS ROUTINE IS TO READ A DATA RECORD FROM THE  */
/* INPUT TAPE INTO 'BUFFER' AND TO PASS THE BUFFER AND LENGTH OF   */
/* THE DATA RECORD IN BYTES 'LENGTH' BACK TO THE CALLING ROUTINE.  */

/***********/
/* INPUTS: */
/***********/

/* BUFFER - BUFFER TO PLACE DATA RECORD FROM TAPE.            */
     /* LENGTH - LENGTH OF DATA BUFFER IN BYTES.                   */

/***********/
/* OUTPUTS: */
/***********/

/* BUFFER - BUFFER CONTAING DATA FROM INPUT TAPE.             */
     /* LENGTH - LENGTH OF DATA RECORD IN BYTES. IF THERE          */
     /*          WAS AN ERROR TRYING TO READ THE RECORD            */
     /*          LENGTH WILL BE SET NEGATIVE. IF AND EOF           */
     /*          IS ENCOUNTERED LENGTH WILL BE SET TO -1.          */

/*********************/
/* INTERNAL VARIABLES: */
/*********************/

/*          DDNAME  - DDNAME OF DDCARD FOR INPUT DEVICE.      */

/*          R       - CHAR TO SIGNAL I/O ROUTINE TO WRITE     */
     /*                    DEVICE.                                 */

/***************/
/* EXTERNALS: */
/***************/

/* TAPEIO - ASSEMBLER ROUTINE TO DO ACTUAL INPUT FROM         */
     /*          DEVICE.                                           */

/*********************/
/* DECLARE INPUTS */
/*********************/

DCL BUFFER(*)   FIXED BIN(15,0);
         DCL LENGTH      FIXED BIN(31,0);
```

```
/******************************/
/* DECLARE INTERNAL VARIABLES */
/******************************/
        DCL DDNAME CHAR(8) INIT('DSPIKEIN');
        DCL R      CHAR(4) INIT('R   ');

/***********************/
/* DECLARE EXTERNALS */
/***********************/
        DCL TAPEIO ENTRY OPTIONS(ASM,INTER);

/*****************************/
/* INPUT FROM INPUT DEVICE */
/*****************************/
        CALL TAPEIO(DDNAME,BUFFER,LENGTH,R);

/********/
/* EXIT */
/********/
        RETURN;
        END; /* READTP */
TAPEOUT: PROCEDURE(BUFFER,LENGTH);

/* THE FUNCTION OF THIS ROUTINE IS TO ACCEPT A DATA BUFFER 'BUFFER' */
/* OF LENGTH 'LENGTH' FROM A CALLING ROUTINE AND OUTPUT THE BUFFER  */
/* TO AN OUTPUT DEVICE NORMALLY A TAPE.                             */

/* INPUTS:                                                          */
/*     BUFFER - BUFFER OF DATA AND CONTROL INFORMATION TO BE SENT   */
/*              TO AN OUTPUT DEVICE.                                */
/*     LENGTH - LENGTH OF DATA BUFFER IN BYTES.                     */
/* OUTPUTS:                                                         */
/*     BUFFER OF LENGTH 'LENGTH'.                                   */
/* INTERNAL VARIABLES:                                              */
/*              DDNAME - DDNAME OF DDCARD FOR OUTPUT DEVICE.        */
/*              W      - CHAR TO SIGNAL I/O ROUTINE TO WRITE        */
/*                       TO DEVICE.                                 */
/* EXTERNALS:                                                       */
/*     TAPEIO - ASSEMBLER ROUTINE TO DO ACTUAL OUTPUT TO DEVICE.    */

/*********************/
/* DECLARE INPUTS */
/*********************/
        DCL BUFFER(*) FIXED BIN(15,0);
        DCL LENGTH    FIXED BIN(31,0);

/******************************/
/* DECLARE INTERNAL VARIABLES */
/******************************/
        DCL DDNAME CHAR(8) INIT('DSPIKOUT');
        DCL W      CHAR(4) INIT('W   ');

/***********************/
/* DECLARE EXTERNALS */
/***********************/
        DCL TAPEIO ENTRY OPTIONS(ASM,INTER);
/******************************/
/* OUTPUT TO OUTPUT DEVICE */
/******************************/
        CALL TAPEIO(DDNAME,BUFFER,LENGTH,W);
```

```
/********/
/* EXIT */
/********/
       RETURN;
       END;    /*TAPEOUT*/
//LKED.SYSLMOD DD DSN=A.GP1.P7094.RDLIB,DISP=SHR
//LKED.GSLIB DD DSN=A.GP1.P7094.GSLIB,DISP=SHR
//LKED.RDLIB DD DSN=A.GP1.P7094.RDLIB,DISP=SHR
//LKED.SYSIN DD *
  ENTRY PLISTART
  INCLUDE GSLIB(CATLAB,DDCK,JGNYDNO)
  INCLUDE RDLIB(TAPEIO)
  NAME DESPIK2(R)
//*O.SYSPRINT DD SYSOUT=*
//*O.PLIDUMP DD SYSOUT=*
//*O.DSPIKEIN DD UNIT=TAPE,DISP=(OLD,KEEP),DSN=NFB.DESPIKE.TEST,
//*    LABEL=(,NL,EXPDT=98000),DCB=(RECFM=U,BLKSIZE=32000),
//*    VOL=SER=DESPIK
//*O.DSPIKEIN DD UNIT=SYSDA,DISP=(OLD,KEEP),DSN='SNFB.CO2TEST.DATA'
//*O.DSPIKOUT DD UNIT=TAPE,DISP=(NEW,PASS),
//*   DSN=NFB.TEST,LABEL=(,NL,EXPDT=98000),
//*   DCB=(RECFM=U,BLKSIZE=32000,DEN=4)
//*O.SYSIN DD *
//* 10   11   500   4.  4 971.0 8
//*1000 50  120  61 400 97 900
```

```
**** TSO FOREGROUND HARDCOPY ****
DSNAME=A.GP1.UTIL.SOURCE                                    (CROSPLT)

//$NFBDSP  JOB   999,NFB,
//   MSGLEVEL=(1,1),
//   TIME=(5,0),
//   REGION=1000K,
//   MSGCLASS=Z,
//   NOTIFY=$NFB
//*MAIN FETCH=NONE
//STEP1 EXEC PLIXCL,
//   PARM.PLI='OPT(2),X,A,OF,MARGINS(2,72,1),LINECOUNT(56),MAP,NEST',
//   PARM.LKED='LIST,LET,MAP'
//PLI.SYSIN DD *
*PROCESS MAR(2,72,1);
CROSPLT: PROC OPTIONS(MAIN);

/* MAIN MODULE OF PROGRAM TO GENERATE CROSSPLOT   */
  /* OF DESPIKE INFORMATION                          */

/* INPUT VARIABLES */
           /*  ID              -  CARD TYPE IDENTIFIER WILL BE CP OR DP*/
           /*  FIRST_CP_RECORD -  FIRST RECORD FOR CROSSPLOT            */
           /*  LAST_CP_RECORD  -  LAST RECORD FOR CROSSPLOT             */
           /*  CP_INC          -  RECORD INCREMENT FOR CROSSPLOT        */
           /*  CP_NOR_WIND     -  NORMILIZING WINDOW FOR CROSSPLOT      */
           /*  TRACE#          -  TRACES WITHIN RECORD FOR CROSSPLOT    */

DCL ID                CHAR(2)         INIT('  ');
           DCL FIRST_CP_RECORD   FIXED BIN(31,0) INIT(0);
           DCL LAST_CP_RECORD    FIXED BIN(31,0) INIT(0);
           DCL CP_INC            FIXED BIN(15,0) INIT(0);
           DCL CP_NOR_WIND       FIXED BIN(31,0) INIT(0);
           DCL DR                FLOAT(6)        INIT(0);
           DCL TRACE#(24)        FIXED BIN(15,0) INIT((24)0);

/* INTERNAL VARIABLES */

/* CP_REQUESTED      - SET TO ONE IF CP REQUESTED            */
           /* NUM_CP_TRACES     - NUMBER OF TRACES IN TRACE# VECTOR     */
           /* CP                - CHAR VARIABLE TO TEST FOR CP CARD     */

DCL CP_REQUESTED      FIXED BIN(15,0) INIT(0);
           DCL NUM_CP_TRACES     FIXED BIN(15,0) INIT(0);
           DCL CP                CHAR(2)         INIT('CP');
           DCL ITN               FIXED BIN(15,0) INIT(0);
           DCL ICNT              FIXED BIN(15,0) INIT(0);
           DCL PLT_CNT           FIXED BIN(15,0) INIT(0);
           DCL FIRST_FLAG        FIXED BIN(31,0) INIT(0);
           DCL LENGTH            FIXED BIN(31,0) INIT(0);
           DCL NC                FIXED BIN(15,0) INIT(0);
           DCL NS                FIXED BIN(31,0) INIT(0);
           DCL I                 FIXED BIN(15,0) INIT(0);
           DCL J                 FIXED BIN(15,0) INIT(0);
           DCL TRA_FLG           FIXED BIN(15,0) INIT(0);
           DCL EOF               FIXED BIN(15,0) INIT(0);
           DCL MEAN              FLOAT(6) INIT(1E1);
           DCL D(4000,24)        FLOAT(6);
           DCL AN(4000,24)       FLOAT(6);

DCL SAV_FILE          FIXED BIN(31,0) INIT(99999);
           DCL FB(24)            FIXED BIN(31,0) INIT((24)0);
           DCL MOD               FIXED BIN(31,0) INIT(0);

/*BRING IN TRACE STRUCTURE*/
           DECLARE
              1 TRACE_ID_HEADER BASED(TRA_INP_PNTR),
                2 TRA_SEQ_NUM_LINE      FIXED BIN(31,0),
                2 TRA_SEQ_NUM_REEL      FIXED BIN(31,0),
                2 FILE_NUM             FIXED BIN(31,0),
                2 TRACE_NUM            FIXED BIN(31,0),
                2 ENERGY_SO_PT_NUM     FIXED BIN(31,0),
                2 SHOT_POINT           FIXED BIN(31,0),
                2 BLANK1               CHAR(4) INIT('    '),
                2 TRA_ID_CODE          FIXED BIN(15,0),
                2 BLANK2               CHAR(2) INIT('  '),
                2 BLANK3               CHAR(2) INIT('  '),
                2 DATA_USE             FIXED BIN(15,0),
                2 BLANK4               CHAR(12) INIT('            '),
                2 SOURCE_DEPTH         FIXED BIN(31,0),
                2 BLANK5               CHAR(54) INIT('  '),
                2 TIME_BRK_DIFF        FIXED BIN(15,0),
```

```
            2 BLANK5                 CHAR(6) INIT(' '),
            2 NUM_SAMP               FIXED BIN(15,0),
            2 SAMP_INTERV            FIXED BIN(15,0),
            2 GAIN_TYPE              FIXED BIN(15,0),
            2 INSTR_GAIN             FIXED BIN(15,0),
            2 BLANK7                 CHAR(18) INIT(' '),
            2 ALIAS_FILT_FREQ        FIXED BIN(15,0),
            2 ALIAS_FILT_SLOPE       FIXED BIN(15,0),
            2 NOTCH_FILT_FREQ        FIXED BIN(15,0),
            2 BLANK8                 CHAR(10) INIT(' '),
            2 YEAR                   FIXED BIN(15,0),
            2 DAY                    FIXED BIN(15,0),
            2 HOUR                   FIXED BIN(15,0),
            2 MINUTE                 FIXED BIN(15,0),
            2 SECOND                 FIXED BIN(15,0),
            2 TIME_BASIS_CODE        FIXED BIN(15,0),
            2 BLANK9                 CHAR(12) INIT(' '),
            2 REM_TELE_UNIT_NUM      FIXED BIN(15,0),
            2 REM_TELE_CHAN_NUM      FIXED BIN(15,0),
            2 BLANK10                CHAR(54) INIT(' '),
            2 TRACE_REFER1           FIXED BIN(15,0);

DECLARE
        1 TRACE_DATA             BASED(TRA_PNTR),
          2 NMB_SAMP             FIXED BIN (15,0),
          2 A(II REFER(NMB_SAMP)) FLOAT DEC(6,0);

DCL TRACE(8000) FLOAT(6) BASED(TRA_INP_PNTR);
      DCL TRACI(8000) FIXED BIN(15,0);

/* DECLARE POINTERS */
      DCL (TRA_INP_PNTR,
           TRA_PNTR
           ) PTR;

DCL ADDR BUILTIN;
      DCL READTP EXTERNAL ENTRY((*)FIXED BIN(15), FIXED BIN(31));
      DCL XPLTCAL EXTERNAL ENTRY (PTR,PTR,FIXED BIN(31),
                                  FIXED BIN(31),FIXED BIN(15), (*,*)FLOAT(6),(*,*)FLOAT(6),
                                  FLOAT(6),FIXED BIN(31),
                                  FLOAT(6));
      DCL XPLOT EXTERNAL ENTRY((*,*)FLOAT(6),(*,*)FLOAT(6),
                                FIXED BIN(31),FIXED BIN(15),
                                FIXED BIN(31),(*)FIXED BIN(15),
                                FLOAT(6));

TRA_INP_PNTR = ADDR(TRACI);

/* END OF FILE */
  ON ENDFILE(SYSIN) BEGIN;
    IF CP_REQUESTED = 0 THEN DO;
      PUT SKIP EDIT('DATA ERROR  ABORT   DSPIKE') (A);
      STOP;
    END;
  END;

/* INPUT PARMS */
      GET FILE(SYSIN) EDIT(ID) (A(2));

/* TEST FOR CROSSPLOT REQUESTED */
      IF ID = CP THEN DO;
        CP_REQUESTED = 1;
        GET FILE(SYSIN) EDIT(FIRST_CP_RECORD,
                             LAST_CP_RECORD,
                             CP_INC,
                             CP_NOR_WIND,
                             SAMPLE_RATE,
                             DR)
                             (F(4),F(4),F(2),F(5),F(1),F3,1));
        GET FILE(SYSIN) EDIT((TRACE#(I) DO I=1 TO 24))
                             (COL(1),(24)F(3));
      GET FILE(SYSIN) EDIT((FB(I) DO I = 1 TO 18))
                             (COL(1),(18)F(4));
      GET FILE(SYSIN) EDIT((FB(I) DO I = 19 TO 24))
                             (COL(1),(5)F(4));
```

```
/* COUNT TRACE NUMBERS */
    DO J = 1 TO 24;
       IF TRACE#(J) ¬= 0 THEN NUM_CP_TRACES = NUM_CP_TRACES + 1;
    END;

/* PRINT INPUT VALUES */
    PUT SKIP EDIT('CROSSPLOT REQUESTED') (A);
    PUT SKIP EDIT('FIRST RECORD FOR CROSSPLOT IS ',
                   FIRST_CP_RECORD) (A,F(4));
    PUT SKIP EDIT('STOP RECORD FOR CROSSPLOT IS ',
                   LAST_CP_RECORD) (A,F(4));
    PUT SKIP EDIT('CROSSPLOT INCREMENT IS         ',

CP_INC) (A,F(2));
    PUT SKIP EDIT('CROSSPLOT NORMALIZING WINDOW IS',
                   CP_NOR_WIND,' MS')
                   (A,F(5),A);
    PUT SKIP EDIT('SAMPLE_RATE IS ',SAMPLE_RATE) (A,F(1));
    IF DR = 0 THEN DR = 1E+0;
    PUT SKIP EDIT('DERIVATIVE MEAN TO AMPLITUDE MEAN RATIO',
                   DR) (A,F(3,1));
    PUT SKIP EDIT('TRACES WITHIN RECORD FOR CROSSPLOT FOLLOW')
                   (A);
    PUT SKIP EDIT((TRACE#(I) DO I = 1 TO NUM_CP_TRACES)) (F(3));
    PUT SKIP EDIT('FIRST BREAK VALUES IN MS:') (A);
    PUT SKIP EDIT((FB(I) DO I = 1 TO NUM_CP_TRACES)) (F(5));

END; /* CP READ IF */
ELSE DO;
    PUT SKIP EDIT('ERROR IN INPUT DATA   *ABORT* CROSSPLT')
                   (A);
END;

/* CONVERT FIRST BREAKS TO SAMPLES */
DO I = 1 TO NUM_CP_TRACES;
    FB(I) = FB(I)/SAMPLE_RATE;
END;

/* CONVERT WINDOW LENGTH TO SAMPLES */
CP_NOR_WIND = CP_NOR_WIND/SAMPLE_RATE;

/*   SET MEAN    */
MEAN = 1E+1;

/* INPUT TAPE RECORD */
TRA_FLG = 0;
ITN = 1;
DO WHILE (EOF=0);
    CALL READTP(TRACI,LENGTH);
    IF LENGTH = -1 THEN DO;
        EOF = 1;
    END;
    ELSE DO;
        IF LENGTH ¬= 3200 & LENGTH ¬= 400 THEN DO;
            TRACE_REFER1 = NUM_SAMP + 1;
            TRA_PNTR = ADDR(TRACE_REFER1);
            A(NUM_SAMP+1) = A(NUM_SAMP);
            IF FILE_NUM = FIRST_CP_RECORD | FIRST_CP_RECORD = 0
                   THEN DO;
                FIRST_CP_RECORD = -1;
                SAV_FILE = FILE_NUM;
                FIRST_FLAG = 1;
                ICNT = CP_INC;
            END;
            IF SAV_FILE = FILE_NUM THEN DO;
                IF CP_INC = ICNT THEN DO;
                    DO I = 1 TO NUM_CP_TRACES WHILE(TRA_FLG=0);
                        IF TRACE#(I) = TRACE_NUM THEN DO;
                            TRA_FLG = 1;
                            NS = NUM_SAMP;
                            MOD = FB(I);
```

```
                         CALL XPLTCAL(TRA_INP_PNTR,TRA_PNTR,NS,
                                      CP_NOR_WIND,ITN,D,AN,MEAN,MOD,
                                      OR);
                         ITN = ITN + 1;
                       END;
                     END;
                     TRA_FLG = 0;
                   END;
                 END;
               ELSE DO;
                 IF FIRST_FLAG = 1 THEN DO;
                   IF CP_INC = ICNT THEN DO;
                     ITN = ITN - 1;
                     CALL XPLOT(AN,D,NS,ITN,SAV_FILE,TRACE#,MEAN);
                     PLT_CNT = PLT_CNT + 1;
                     ICNT = 1;
                   END;
                   ELSE DO;
                     ICNT = ICNT + 1;
                   END;
                   SAV_FILE = FILE_NUM;
                   ITN = 1;
                 END;
               END;
               IF FILE_NUM = LAST_CP_RECORD THEN EOF = 1;
             END;
           END;
         END;
         PUT PAGE EDIT(' ') (A);
         IF LENGTH = -1 THEN
           PUT SKIP EDIT('END OF FILE ENCOUNTERED') (A);
         PUT SKIP EDIT('END OF JOB',PLT_CNT,' PLOTS GENERATED')
                      (A,F(3),A);
         END; /* CROSPLT */
*PROCESS MAR(2,72,1);
XPLOT: PROC(AN,D,NS,NT,FILE,TRACE#,MEAN);

/* INPUT VARIABLES */
       /* AN - AMPLITUDE DATA                    */
       /* D  - DERIVATIVE                        */
       /* NT - NUMBER OF TRACES IN PLOT          */
       /* NS - NUMBER OF SAMPLES                 */
       /* FILE - RECORD NUMBER OF PLOT           */
       /* TRACE# - TRACE NUMBERS IN PLOT         */
       /* MEAN - MEAN TO NORMALIZE ON            */

DCL NS            FIXED BIN(31,0);
       DCL NT            FIXED BIN(15,0);
       DCL FILE          FIXED BIN(31,0);
       DCL TRACE#(24)    FIXED BIN(15,0);
       DCL MEAN          FLOAT(6);
       DCL IM            FIXED BIN(15,0) INIT(0);
       DCL R2            FLOAT(6);
       DCL R4            FLOAT(6);
       DCL R6            FLOAT(6);
       DCL P2            FLOAT(6);
       DCL P4            FLOAT(6);
       DCL P6            FLOAT(6);
       DCL AS            FLOAT(6);
       DCL AN(4000,24)   FLOAT(6);

DCL CP(50,66)     CHAR(1) INIT((3300)' ');
       DCL LINE(50) CHAR(66) BASED (CP_PNTR);
       DCL D(4000,24)    FLOAT(6);
       DCL DP(49,60)     FIXED BIN(15,0) INIT((2880)0);
       DCL TABLE(9) CHAR(1) INIT('1','2','3','4','5','6','7','8','9');
       DCL M             FIXED BIN(15,0);
       DCL L             FIXED BIN(15,0);
       DCL I             FIXED BIN(15,0);
       DCL K             FIXED BIN(15,0);
       DCL J             FIXED BIN(15,0);
       DCL CP_PNTR PTR;

DCL ABS BUILTIN;
       DCL ADDR BUILTIN;

CP_PNTR = ADDR(CP(1,1));

DO J = 1 TO 50;
       DO K = 1 TO 66;
         CP(J,K) = ' ';
       END;
       END;
```

```
     DO J = 1 TO 49;
        CP(J,3) = '+';
     END;

CP(21,1) = 'A';
     CP(22,1) = 'M';
     CP(23,1) = 'P';
     CP(24,1) = 'L';
     CP(25,1) = 'I';
     CP(26,1) = 'T';
     CP(27,1) = 'D';
     CP(28,1) = 'U';
     CP(29,1) = 'E';

/* PUT DATA POINTS INTO 60 X 30 GRID */

DO I = 1 TO 49;
     DO K = 1 TO 60;
        DP(I,K) = 0;
     END;
     END;

DO K = 1 TO NT;
     DO J = 1 TO NS;
        M = AN(J,K)/1.222E0 + 5E-1;
        IF M < 1 THEN M = 1;
        L = D(J,K) + 5E-1;
        IF L < 1 THEN L = 1;
        IF M > 49 THEN M = 49;
        IF L > 60 THEN L = 60;
        DP(M,L) = DP(M,L) + 1;
     END;
     END;

L = 1;
     K = 49;
     DO I = 2 TO 50;
     DO J = 4 TO 63;

IF DP(K,L) = 0 THEN CP(I,J) = ' ';
        IF DP(K,L) > 10 THEN CP(I,J) = 'O';
        IF DP(K,L) > 0 & DP(K,L) < 10 THEN DO;
           M = DP(K,L);
           CP(I,J) = TABLE(M);
        END;
        L = L + 1;
     END;
     L = 1;
     K = K - 1;
     END;

/* BEGIN PLOT */
     PUT PAGE EDIT(' ') (A);
     PUT SKIP EDIT('0','3X','6X') (COL(4),A,COL(33),A,COL(63),A);
     PUT      EDIT('DERIVATIVE VERSUS AMPLITUDE CROSSPLOT')
              (COL(75),A);
     PUT SKIP EDIT('+','+','+','T','+','+','+')
              (COL(3),A,COL(13),A,COL(23),A,COL(33),A,COL(43),A,COL(53),
               A,COL(63),A);
     CP(1,64) = '+';
     CP(1,65) = '6';
     CP(1,66) = 'X';
     CP(25,64) = '+';
     CP(25,65) = '3';
     CP(25,66) = 'X';
     CP(49,64) = '+';
     CP(49,65) = '0';
     IM = 49-(MEAN/1.222E0 + 5E-1);
     CP(IM,64) = 'M';

CP(50,1) = ' ';
     CP(50,2) = ' ';
     CP(50,3) = ' ';
     DO I = 4 TO 63;
        CP(50,I) = '+';
     END;

K = 1;
     DO I = 1 TO 50;
        PUT SKIP EDIT(LINE(I)) (A);
        IF I = 3 THEN
           PUT  EDIT ('RECORD NUMBER ',FILE) (COL(75),A,F(6));
        IF I = 4 THEN
           PUT EDIT('TRACES:') (COL(75),A);
```

```
        IF I > 5 & K <=NT THEN DO;
            PUT EDIT(TRACE#(K)) (COL(82),F(3));
            K = K + 1;
        END;
END;

DO I = 1 TO 66;
    CP(50,I) = ' ';
END;

CP(50,4) = '0';
CP(50,33)= '3';
CP(50,34) = 'X';
CP(50,63) = '6';
CP(50,64) = 'X';
IM = MEAN + 3.5E0;

CP(50,IM) = 'M';
PUT SKIP EDIT(LINE(50)) (A);
R2 = 0;
R4 = 0;
R6 = 0;
DO I = 1 TO NS;
DO J = 1 TO NT;
    IF AN(I,J)**2 + D(I,J)**2 > 1.225E+3 THEN DO;
        R2 = R2 + 1;
    END;
    IF AN(I,J)**2 + D(I,J)**2 > 1.6E+3 THEN DO;
        R4 = R4 + 1;
    END;
    IF AN(I,J)**2 + D(I,J)**2 > 2.025E+3 THEN DO;
        R6 = R6 + 1;
    END;
END;
END;
AS = NT*NS;
P2 = R2/AS*1E2 + 5E-1;
P4 = R4/AS*1E2 + 5E-1;
P6 = R6/AS*1E2 + 5E-1;
IF P2 < 1E0 THEN P2 = 0E0;
IF P4 < 1E0 THEN P4 = 0E0;
IF P6 < 1E0 THEN P6 = 0E0;
PUT SKIP EDIT('<---DERIVATIVE--->') (COL(22),A);
PUT SKIP EDIT(' ') (A);
PUT SKIP EDIT('% REJECTED FOR RADIUS = 3.5X:',P2) (A,F(6,0));
PUT SKIP EDIT('% REJECTED FOR RADIUS = 4.0X:',P4) (A,F(6,0));
PUT SKIP EDIT('% REJECTED FOR RADIUS = 4.5X:',P6) (A,F(6,0));
END; /* XPLOT */
* PROCESS MAR(2,72,1);
XPLTCAL: PROC(TRA_INP_PNTR,TRA_PNTR,NS,W,INT,D,AN,MEAN,MOD,DR);

/* INPUT VARIABLES */
/* TRACE_PNTR - LOCATION OF TRACE              */
/* NS - NUMBER SAMPLES                         */
/* LC - LAST RECORD TO DESPIKE                 */
/* W  - NUMBER SAMPLE/NORMALIZING WINDOW       */
/* INT- TRACE NUMBER                           */
/* MEAN - MEAN TO NORMALIZE                    */
/* MOD - FIRST BREAK MODIFICATION              */
/* DR  - DERIVATIVE TO AMPLITUDE RATIO         */

DCL NS          FIXED BIN(31,0);
DCL W           FIXED BIN(31,0);
DCL INT         FIXED BIN(15,0);
DCL MEAN        FLOAT(6);
DCL DR          FLOAT(6);
DCL MOD         FIXED BIN(31,0);
DCL NC          FIXED BIN(31,0);
DCL NW          FIXED BIN(31,0);
DCL LS          FIXED BIN(31,0);
DCL FS          FIXED BIN(31,0);
DCL WC          FIXED BIN(31,0);
DCL NS2         FIXED BIN(31,0) INIT(0);
DCL AN(4000,24)   FLOAT(6);
DCL D(4000,24)    FLOAT(6);
DCL AF          FLOAT(6);
DCL AT          FLOAT(6);
```

```
        DCL DF          FLOAT(6);
        DCL DT          FLOAT(6);
        DCL FF          FIXED BIN(15,0);
        DCL Z           FIXED BIN(15,0);
        DCL G           FIXED BIN(15,0);
        DCL H           FIXED BIN(15,0);
        DCL K           FIXED BIN(15,0);
        DCL J           FIXED BIN(15,0);

/*BRING IN TRACE STRUCTURE*/
        DECLARE
            1 TRACE_ID_HEADER           BASED(TRA_INP_PNTR),
              2 TRA_SEQ_NUM_LINE        FIXED BIN(31,0),
              2 TRA_SEQ_NUM_REEL        FIXED BIN(31,0),
              2 FILE_NUM                FIXED BIN(31,0),
              2 TRACE_NUM               FIXED BIN(31,0),
              2 ENERGY_SO_PT_NUM        FIXED BIN(31,0),
              2 SHOT_POINT              FIXED BIN(31,0),
              2 BLANK1                  CHAR(4) INIT(' '),
              2 TRA_ID_CODE             FIXED BIN(15,0),
              2 BLANK2                  CHAR(2) INIT(' '),
              2 BLANK3                  CHAR(2) INIT(' '),
              2 DATA_USE                FIXED BIN(15,0),
              2 BLANK4                  CHAR(12) INIT(' '),
              2 SOURCE_DEPTH            FIXED BIN(31,0),
              2 BLANK5                  CHAR(54) INIT(' '),
              2 TIME_BRK_DIFF           FIXED BIN(15,0),
              2 BLANK6                  CHAR(6) INIT(' '),
              2 NUM_SAMP                FIXED BIN(15,0),
              2 SAMP_INTERV             FIXED BIN(15,0),
              2 GAIN_TYPE               FIXED BIN(15,0),
              2 INSTR_GAIN              FIXED BIN(15,0),
              2 BLANK7                  CHAR(18) INIT(' '),
              2 ALIAS_FILT_FREQ         FIXED BIN(15,0),
              2 ALIAS_FILT_SLOPE        FIXED BIN(15,0),
              2 NOTCH_FILT_FREQ         FIXED BIN(15,0),
              2 BLANK8                  CHAR(10) INIT(' '),
              2 YEAR                    FIXED BIN(15,0),
              2 DAY                     FIXED BIN(15,0),
              2 HOUR                    FIXED BIN(15,0),
              2 MINUTE                  FIXED BIN(15,0),
              2 SECOND                  FIXED BIN(15,0),
              2 TIME_BASIS_CODE         FIXED BIN(15,0),
              2 BLANK9                  CHAR(12) INIT(' '),
              2 REM_TELE_UNIT_NUM       FIXED BIN(15,0),
              2 REM_TELE_CHAN_NUM       FIXED BIN(15,0),
              2 BLANK10                 CHAR(54) INIT(' '),
              2 TRACE_REFER1            FIXED BIN(15,0);

DECLARE
            1 TRACE_DATA                BASED(TRA_PNTR),
              2 NMB_SAMP                FIXED BIN (15,0),
              2 A(II REFER(NMB_SAMP)) FLOAT DEC(6,0);

/* DECLARE POINTERS   */
        DCL (TRA_INP_PNTR,
             TRA_PNTR
             ) PTR;
        DCL ABS BUILTIN;
        DCL TRACE_PNTR PTR;

NS2 = NS - MOD;
NW = NS2/W;
WC=NW*W;
NW =NS2/W + 1;
IF NS2 > WC THEN NW = NW + 1;
WC = 0;
/* CALCULATE DERIVATIVE MAGNITUDE BY FORWARD DIFFERENCE */

DO J = 1 TO NS;
    K = J + 1;
    D(J,INT) = ABS(A(K) - A(J));
END;

/* CALCULATE A WINDOW NORMALIZED AMPLITUDE AND DERIVATIVE */
/* CALCULATE WINDOW MEAN AMPLITUDE AND MEAN DERIVATIVE    */
/* CHECK FOR LAST WINDOW                                  */

DO WHILE (WC < NW);
    WC = WC + 1;
    IF WC = NW THEN DO;
        LS = NS;
    END;
    ELSE DO;
```

```
        LS = (WC-1)*W + MOD;
    END;

FS = (WC-2)*W+1 + MOD;

IF WC = 1 THEN DO;
            FS = 1;
            LS = MOD;
        END;

/* CALCULATE MEAN AMPLITUDE */
        AT = 0;
        DO K = FS TO LS;
            AT = AT + ABS(A(K));
        END;
        IF AT = 0 THEN AT = 1;

/* CALCULATE NORMALIZING FACTOR SO MEAN AMPLITUDE IS 10 */
        AF = 10*(LS-FS)/AT;
        /* NORMALIZE AMPLITUDES */
        DO K = FS TO LS;
            AN(K,INT) = AF*ABS(A(K));
        END;

/* CALCULATE MEAN DERIVATIVE */
        DT = 0;
        DO K = FS TO LS;
            DT = DT + D(K,INT);
        END;
        IF DT = 0 THEN DT = 1;

/* CALCULATE NORMALIZING FACTOR SO MEAN DERIVATIVE IS 10 */
        DF = DR*10*(LS-FS)/DT;
        /* NORMALIZE DERIVATIVES */
        DO K = FS TO LS;
            D(K,INT) = DF*D(K,INT);
        END;

IF FS>= LS THEN WC=NW;
    END; /* DO WHILE (WC> NW) */

END; /* XPLOT */
 PROCESS;
READTP: PROCEDURE(BUFFER,LENGTH);

/* THE FUNCTION OF THIS ROUTINE IS TO READ A DATA RECORD FROM THE  */
/* INPUT TAPE INTO 'BUFFER' AND TO PASS THE BUFFER AND LENGTH OF   */
/* THE DATA RECORD IN BYTES 'LENGTH' BACK TO THE CALLING ROUTINE.  */

/************/
/* INPUTS: */
/************/

/* BUFFER - BUFFER TO PLACE DATA RECORD FROM TAPE.             */
    /* LENGTH - LENGTH OF DATA BUFFER IN BYTES.                    */

/************/
/* OUTPUTS: */
/************/

/* BUFFER - BUFFER CONTAING DATA FROM INPUT TAPE.              */
    /* LENGTH - LENGTH OF DATA RECORD IN BYTES. IF THERE           */
    /*          WAS AN ERROR TRYING TO READ THE RECORD             */
    /*          LENGTH WILL BE SET NEGATIVE. IF AND EOF            */
    /*          IS ENCOUNTERED LENGTH WILL BE SET TO -1.           */

/***********************/
/* INTERNAL VARIABLES: */
/***********************/

/*          DDNAME - DDNAME OF DDCARD FOR INPUT DEVICE.        */
    /*          R      - CHAR TO SIGNAL I/O ROUTINE TO WRITE       */
    /*                   DEVICE.                                   */

/************/
/* EXTERNALS: */
/************/

/* TAPEIO - ASSEMBLER ROUTINE TO DO ACTUAL INPUT FROM          */
    /*          DEVICE.                                            */
```

```
/*********************/
/* DECLARE INPUTS */
/*********************/
        DCL BUFFER(*)   FIXED BIN(15,0);
        DCL LENGTH      FIXED BIN(31,0);

/************************************/
/* DECLARE INTERNAL VARIABLES */
/************************************/
        DCL DDNAME  CHAR(8) INIT('DSPIKEIN');
        DCL R       CHAR(4) INIT('R   ');

/*********************/
/* DECLARE EXTERNALS */
/*********************/
        DCL TAPEIO ENTRY OPTIONS(ASM,INTER);

/***************************/
/* INPUT FROM INPUT DEVICE */
/***************************/
        CALL TAPEIO(DDNAME,BUFFER,LENGTH,R);

/********/
/* EXIT */
/********/
        RETURN;
        END; /* READTP */
//LKED.SYSLMOD DD DSN=A.GP1.P7094.RDLIB,DISP=SHR
//LKED.GSLIB   DD DSN=A.GP1.P7094.GSLIB,DISP=SHR
//LKED.RDLIB   DD DSN=A.GP1.P7094.RDLIB,DISP=SHR
//LKED.SYSIN   DD *
  ENTRY PLISTART
  INCLUDE RDLIB(CROSSPLT)
  NAME CROSSPL2(R)
//*0.SYSPRINT DD SYSOUT=*
//*0.PLIDUMP  DD SYSOUT=*
//*0.DSPIKEIN DD UNIT=TAPE,DISP=(OLD,KEEP),DSN=NFB.DESPIKE.TEST,
//*     LABEL=(,NL,EXPDT=98000),DCB=(RECFM=U,BLKSIZE=32000),
//*     VOL=SER=1234
//*0.DSPIKEIN DD UNIT=SYSDA,DISP=(OLD,KEEP),DSN='$NFB.CO2TEST.DATA'
//*0.SYSIN   DD *
//*571  575  1   5004
//*   5  15  20  25  30
//*0 980 900 850 800 750
//*
```

That which is claimed is:

1. A method for removing noise from seismic data, wherein the seismic data comprises at least one seismic trace generated by at least one geophone in response to seismic waves imparted into the earth, said method comprising the steps of:

(a) selecting a plurality of data points in said seismic trace;

(b) determining the amplitude of said seismic trace at said plurality of dat points;

(c) determining the derivative of said seismic trace at said plurality of data points;

(d) crossplotting the derivative values determined in step (c) as a function of the amplitude values determined in step (b);

(e) selecting a rejection line on the crossplot of step (d), wherein all data points which plot outside of said rejection line are treated as noise; and (f) producing a substantially noise free seismic trace by assigning a new amplitude value to each data point which plots outside of said rejection line to thereby remove noise at said data point from said seismic trace.

2. A method in accordance with claim 1 wherein the derivative of said seismic trace at said plurality of data points is determined by a two point difference calculation.

3. A method in accordance with claim 1 wherein said step of assigning a new amplitude value comprises zeroing the amplitude value of each data point which plots outside of said rejection line.

4. A method in accordance with claim 1, wherein data points which plot inside of said rejection line are good data points and data points which plot outside of said rejection line are bad data points, and wherein in step (f) for any particular bad data point a new amplitude value is assigned by either zeroing the amplitude value for said particular bad data point or by interpolating a new amplitude value for said particular bad data point based on good data points on each side of said particular bad data point, said interpolating being carried out if said good data points on each side of said particular bad data point have the same polarity, said zeroing being carried out if the number of consecutive bad data points exceeds a predetermined number or if a polarity reversal occurs between said good data points on each side of said particular bad data point.

5. A method in accordance with claim 1 wherein data points which plot inside of said rejection line are good data points, and wherein said step of assigning a new amplitude value comprises interpolating a new amplitude for the seismic trace at each data point which plots outside of said rejection line based on good data points on each side of the data points which plots outside of said rejection line.

6. A method for removing noise from seismic data, wherein the seismic data comprises at least one seismic trace generated by at least one geophone in response to seismic waves imparted into the earth, said method comprising the steps of:
  (a) selecting a plurality of data points for said seismic trace;
  (b) selecting a normalizing window having a desired time length, wherein said normalizing window contains at least a portion of said plurality of data points;
  (c) determining the amplitude of said seismic trace at all data points contained in said normalizing window;
  (d) determining the average of the amplitudes determined in step (c) to establish an average amplitude;
  (e) selecting a normalizing constant having a desired magnitude;
  (f) dividing said normalizing constant by said average amplitude to establish a first multiplier;
  (g) multiplying the amplitude of said seismic trace at each of the plurality of data points contained in said normalizing window by said first multiplier to establish a plurality of normalized amplitude values for the seismic trace at each of the data points contained in said normalizing window;
  (h) determining the derivative of said seismic trace at each of the plurality of data points contained in said normalizing window;
  (i) determining the average of the derivatives determined in step (h) to establish an average derivative for said normalizing window;
  (j) dividing said normalizing constant by said average derivative for said normalizing window to establish a second multiplier;
  (k) multiplying each derivative determined in step (h) by said second multiplier to establish a normalized derivative value for the seismic trace at each data point contained in said normalizing window;
  (l) crossplotting the normalized derivative values determined in step (k) as a function of the normalized amplitude values determined in step (g);
  (m) selecting a rejection line on the crossplot of step (l), wherein all data points which plot outside of said rejection line are treated as noise; and
  (n) producing a substantially noise free seismic trace by assigning a new amplitude value to each data point which plots outside of said rejection line to thereby remove noise at said data point from said seismic trace.

7. A method in accordance with claim 6 wherein said normalizing constant has a magnitude of about 2.

8. A method in accordance with claim 6 wherein the derivative of said seismic trace at said plurality of data points is determined by a two point difference calculation.

9. A method in accordance with claim 6 wherein said normalizing window contains at least about 100 data points.

10. A method in accordance with claim 9 wherein said data points are 4 milliseconds apart and wherein the length of said normalizing window is in the range of about 500 milliseconds to about 1000 milliseconds.

11. A method in accordance with claim 6 wherein said rejection line is a circle.

12. A method in accordance with claim 11 wherein the radius of said circle is in the range of about 3 times said normalizing constant to about 6 times said normalizing constant.

13. A method in accordance with claim 12 wherein the radius of said circle is in the range of about 4 times said normalizing constant to about 4.5 times said normalizing constant.

14. A method in accordance with claim 6 wherein said step of assigning a new amplitude value comprises zeroing the amplitude value at each data point which plots outside of said rejection line.

15. A method in accordance with claim 6 wherein steps (a)–(n) are repeated to improve the removal of noise from said data.

16. A method in accordance with claim 6, wherein data points which plot inside of said rejection line are good data points and data points which plot outside of said rejection line are bad data points, and wherein in step (n) for any particular bad data point a new amplitude value is assigned by either zeroing the amplitude value of said particular data point or by interpolating a new amplitude value for said particular bad data point based on good data points on each side of said particular bad data point, said interpolating being carried out if said good data points on each side of said particular bad data point have the same polarity, said zeroing being carried out if the number of consecutive bad data points exceeds a predetermined number or if a polarity reversal occurs between said good data points on each side of said particular bad data point.

17. A method in accordance with claim 6 wherein data points which plot inside of said rejection line are good data points, and wherein said step of assigning a new amplitude value comprises interpolating a new amplitude for the seismic trace at each data point which plots outside of said rejection line based on good data points on each side of the data point which plots outside of said rejection line.

* * * * *